US011821585B2

(12) United States Patent
Ishikawa

(10) Patent No.: US 11,821,585 B2
(45) Date of Patent: Nov. 21, 2023

(54) HIGH-PRESSURE TANK, MANUFACTURING METHOD FOR HIGH-PRESSURE TANK, AND MANUFACTURING DEVICE FOR HIGH-PRESSURE TANK

(71) Applicant: Honda Motor Co., Ltd., Tokyo (JP)

(72) Inventor: Yusuke Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 17/463,509

(22) Filed: Aug. 31, 2021

(65) Prior Publication Data

US 2022/0107054 A1   Apr. 7, 2022

(30) Foreign Application Priority Data

Oct. 1, 2020   (JP) ................. 2020-167175

(51) Int. Cl.
*F17C 1/02*   (2006.01)
*B29C 53/56*   (2006.01)
(Continued)

(52) U.S. Cl.
CPC ............ *F17C 1/02* (2013.01); *B29C 53/56* (2013.01); *B29C 53/8008* (2013.01); *F17C 1/06* (2013.01);
(Continued)

(58) Field of Classification Search
CPC ...... F17C 1/02; F17C 1/06; F17C 2201/0109; F17C 2203/011; F17C 2203/0604;
(Continued)

(56) References Cited

U.S. PATENT DOCUMENTS

| 5,287,987 A | * | 2/1994 | Gaiser | F17C 1/16 |
| | | | | 220/62.22 |
| 2004/0251007 A1 | * | 12/2004 | Toh | F17C 1/00 |
| | | | | 165/157 |

(Continued)

FOREIGN PATENT DOCUMENTS

| CN | 105423121 | 3/2016 |
| CN | 107448772 | 12/2017 |

(Continued)

OTHER PUBLICATIONS

"Office Action of Japan Counterpart Application" with English translation thereof, dated Mar. 25, 2022, p. 1-p. 6.
(Continued)

*Primary Examiner* — John K Fristoe, Jr.
*Assistant Examiner* — Laura E. Parker
(74) *Attorney, Agent, or Firm* — JCIPRNET

(57) ABSTRACT

A high-pressure tank, a manufacturing method for a high-pressure tank, and a manufacturing device for a high-pressure tank capable of simplifying a shape of a metal fitting and performing high-speed FW molding without causing an idle rotation of the metal fitting or a deformation of a liner, for example, when performing the high-speed FW molding are provided.

A high-pressure tank includes a liner, a reinforcing fiber layer, and a metal fitting. The reinforcing fiber layer is formed on an outer peripheral surface of the liner. The metal fitting is attached to the liner. The liner includes a liner main body and a protrusion part is provided in a part (cylindrical part) of the liner main body. The protrusion part is formed to protrude in a direction moving radially inward from the cylindrical part and to be fittable to a rotating shaft.

11 Claims, 16 Drawing Sheets

(51) Int. Cl.
  *B29C 53/80* (2006.01)
  *F17C 1/06* (2006.01)
  *B29L 31/00* (2006.01)

(52) U.S. Cl.
  CPC .............. *B29L 2031/7156* (2013.01); *F17C 2201/0109* (2013.01); *F17C 2203/011* (2013.01); *F17C 2203/0604* (2013.01); *F17C 2203/0663* (2013.01); *F17C 2209/2154* (2013.01)

(58) Field of Classification Search
  CPC ...... F17C 2203/0663; F17C 2209/2154; F17C 2205/0305; F17C 2209/2163; F17C 2209/232; B29C 53/56; B29C 53/8008; B29L 2031/7156
  USPC ........................................................ 220/589
  See application file for complete search history.

(56) References Cited

U.S. PATENT DOCUMENTS

| | | | |
|---|---|---|---|
| 2011/0220659 A1* | 9/2011 | Strack | F17C 1/16 220/586 |
| 2016/0076700 A1 | 3/2016 | Uchida et al. | |
| 2017/0130900 A1 | 5/2017 | Strange et al. | |

FOREIGN PATENT DOCUMENTS

| | | | |
|---|---|---|---|
| JP | H11147262 | | 6/1999 |
| JP | 2013167298 | | 8/2013 |
| JP | 2016205547 | | 12/2016 |
| JP | 2016205547 A | * | 12/2016 |
| JP | 2019002506 | | 1/2019 |
| JP | 2019002506 A | * | 1/2019 |
| JP | 2019035415 | | 3/2019 |
| JP | 2019035415 A | * | 3/2019 |
| JP | 2020133665 | | 8/2020 |
| WO | WO-2017006504 A1 | * | 1/2017 |

OTHER PUBLICATIONS

"Office Action of China Counterpart Application", dated Feb. 27, 2023, with English translation thereof, pp. 1-19.

* cited by examiner

HIGH-PRESSURE TANK, MANUFACTURING METHOD FOR HIGH-PRESSURE TANK, AND MANUFACTURING DEVICE FOR HIGH-PRESSURE TANK

CROSS-REFERENCE TO RELATED APPLICATION

This application claims the priority benefits of Japanese application no. 2020-167175, filed on Oct. 1, 2020. The entirety of the above-mentioned patent application is hereby incorporated by reference herein and made a part of this specification.

BACKGROUND

Technical Field

The disclosure relates to a high-pressure tank, a manufacturing method for a high-pressure tank, and a manufacturing device for a high-pressure tank.

Description of Related Art

As a high-pressure tank, there is known one in which an outer periphery of a liner forming an inner wall is reinforced with a reinforcing fiber layer (FRP layer) and a metal fitting is attached to the liner. In the high-pressure tank, a part (outer peripheral part) contacting the liner in the metal fitting is formed unevenly and the unevenness of the metal fitting is combined with an unevenness of the liner. Thus, according to this high-pressure tank, it is possible to perform high-speed filament winding (FW) molding without causing an idle rotation of the metal fitting or a deformation of the resinous liner even when a large torque is exerted by the FW molding (for example, see Patent Document 1).

PATENT DOCUMENTS

[Patent Document 1] Japanese Patent Application Laid-Open No. 2013-167298

Since the high-pressure tank of Patent Document 1 forms the unevenness in the metal fitting or the liner, the shape of the metal fitting or the liner becomes complex. However, the high-pressure tank is required to have a simple shape for the metal fitting or the liner in order to withstand the high pressure of the gas. It is not easy to design the shape so as to satisfy this condition and to provide the unevenness on the metal fitting or the liner.

In addition, the high-pressure tank of Patent Document 1 is required to be formed with high accuracy so that the unevenness of the metal fitting is combined with the unevenness of the liner. Here, it is common to mold the metal fitting by forging from the viewpoint of mass-producing the high-pressure tank while maintaining mechanical strength. However, when the metal fitting is molded by forging, it is necessary to carefully consider the moldability of the metal fitting by forging in order to accurately mold the unevenness in the metal fitting and it is more difficult to design the shape of the metal fitting.

SUMMARY

This disclosure provides a high-pressure tank, a manufacturing method for a high-pressure tank, and a manufacturing device for a high-pressure tank capable of simplifying the shape of the metal fitting and performing the high-speed FW molding without causing the idle rotation of the metal fitting or the deformation of the liner, for example, when performing the high-speed FW molding.

In order to solve the above-described problems, the disclosure proposes the following means.

(1) According to an embodiment of the disclosure, there is provided a high-pressure tank (for example, high-pressure tanks 10, 70, 100, 120, and 150 of the embodiments) including: a liner (for example, liners 11, 71, 101, 121, and 151 of the embodiments); a reinforcing fiber layer (for example, a reinforcing fiber layer 12 of the embodiments) which is formed on an outer periphery (for example, outer peripheral surfaces 11a, 71a, 101a, 121a, and 151a of the embodiments) of the liner by rotating the liner with a rotating member (for example, rotating shafts 55, 81, 111, and 131 of the embodiments) and winding a fiber bundle (for example, a fiber bundle 14 of the embodiments) therearound; and a metal fitting (for example, a metal fitting 13 of the embodiments) which is attached to the liner, wherein a part of a main body (for example, a liner main body 15 of the embodiments) of the liner is provided with a protrusion part (for example, protrusion parts 20, 72, 102, and 122 and a convex part 159 of the embodiments) which protrudes in a direction moving away from the main body and is fittable to the rotating member.

According to this configuration, the protrusion part is provided in a part of the main body of the liner and the protrusion part protrudes in a direction moving away from the main body. Thus, it is possible to fit (lock) the rotating member of the manufacturing device (the filament winding device) for the high-pressure tank to the protrusion part of the liner. Accordingly, it is possible to directly transmit the rotational force generated by the manufacturing device for the high-pressure tank to the liner without using the metal fitting.

As a result, it is possible to perform high-speed filament winding (FW) molding without causing the idle rotation of the metal fitting or the deformation of the liner, for example, when performing high-speed FW molding using the manufacturing device for the high-pressure tank. Further, it is not necessary to form the idle rotation preventing unevenness in the metal fitting and it is possible to simplify the shape of the metal fitting. Accordingly, it is possible to increase the workability of the metal fitting.

(2) The protrusion part may protrude in an axial direction of the liner or protrude inward in a radial direction of the liner.

According to this configuration, the protrusion part protrudes in an axial direction of the liner or protrudes inward in a radial direction of the liner. Accordingly, since the rotating member of the manufacturing device for the high-pressure tank is inserted in the axial direction of the liner, it is possible to easily and reliably fit (lock) the rotating member to the protrusion part.

Further, since the protrusion part protrudes in an axial direction of the liner or protrudes inward in a radial direction of the liner, it is possible to easily form, for example, the resinous liner.

(3) A plurality of the protrusion parts may be continuously provided in a circumferential direction of the liner.

According to this configuration, since the plurality of protrusion parts is continuously provided in the circumferential direction of the liner, it is possible to further reliably fit (lock) the rotating member to the protrusion part. Accordingly, it is possible to further efficiently transmit the rotational force generated by the manufacturing device for the high-pressure tank to the liner through the protrusion part.

(4) The liner may include a cylindrical body part (for example, a body part 16 of the embodiments), dome parts (for example, dome parts 17 of the embodiments) which are provided on both sides of the body part in the axial direction, a recessed part (for example, a recessed part 18 of the embodiments) which is provided on the outside of at least one of the dome parts on both sides, and a cylindrical part (for example, a cylindrical part 19 of the embodiments) which protrudes from the recessed part and has a diameter smaller than that of the body part, wherein the protrusion part may be provided in the cylindrical part.

According to this configuration, the protrusion part is formed in the cylindrical part by projecting the cylindrical part from the recessed part of the liner. Accordingly, it is possible to easily fit (lock) the rotating member of the manufacturing device for the high-pressure tank to the protrusion part.

(5) The liner may include a cylindrical body part (for example, a body part 16 of the embodiments), dome parts (for example, dome parts 17 of the embodiments) which are provided on both sides of the body part in the axial direction, a recessed part (for example, a recessed part 18 of the embodiments) which is provided on the outside of at least one of the dome parts on both sides, and a cylindrical part (for example, a cylindrical part 19 of the embodiments) which protrudes from the recessed part and has a diameter smaller than that of the body part, wherein the protrusion part (for example, a protrusion part 72 of the embodiments) may be provided to protrude outward in the axial direction of the liner from a front end (for example, a front end surface 19c of the embodiments) of the cylindrical part.

According to this configuration, the protrusion part protrudes outward in the axial direction from the front end of the cylindrical part. Accordingly, it is possible to easily fit (lock) the rotating member of the manufacturing device for the high-pressure tank to the protrusion part.

(6) The liner may include a cylindrical body part (for example, a body part 16 of the embodiments), dome parts (for example, dome parts 17 of the embodiments) which are provided on both sides of the body part in the axial direction, a recessed part (for example, a recessed part 18 of the embodiments) which is provided on the outside of at least one of the dome parts on both sides, and a cylindrical part (for example, a cylindrical part 19 of the embodiments) which protrudes from the recessed part and has a diameter smaller than that of the body part, wherein the protrusion part (for example, a protrusion part 102 of the embodiments) may be provided to protrude inward in the axial direction of the liner from a base end part (for example, a base end part 19d of the embodiments) of the cylindrical part.

According to this configuration, the protrusion part protrudes inward in the axial direction of the liner from the base end part of the cylindrical part. Thus, it is possible to dispose the protrusion part in the inner space of the dome part and to relatively largely separate the protrusion part to the outside in the radial direction from the axis of the liner. Accordingly, it is possible to efficiently transmit the rotational force generated by the manufacturing device for the high-pressure tank to the protrusion part.

(7) The liner may include a cylindrical body part (for example, a body part 16 of the embodiments) and the body part may include a protrusion part (for example, a protrusion part 122 of the embodiments) which protrudes inward in the radial direction of the liner and the protrusion part may be provided with a groove part or a hole part (for example, a hole part 123 of the embodiments) penetrating in the axial direction of the liner (for example, a liner 121 of the embodiments).

According to this configuration, the protrusion part protrudes inward in the radial direction from the body part and the protrusion part is provided with the hole part or the groove part. Accordingly, since the rotating member of the manufacturing device for the high-pressure tank is fitted (locked) to the hole part or the groove part of the protrusion part, it is possible to transmit the rotational force generated by the manufacturing device for the high-pressure tank to the protrusion part.

Further, since the protrusion part protrudes inward in the radial direction (that is, the inner space of the dome part) from the body part, it is possible to reinforce the body part by the protrusion part. Accordingly, it is possible to increase the strength of the liner.

(8) A fitting member (for example, a fitting member 153 of the embodiments) may be provided to be inserted into the cylindrical part and to be fitted to the protrusion part (for example, a protrusion part 152 of the embodiments), and an inner peripheral surface of the fitting member may be provided with a convex part (for example, a convex part 159 of the embodiments) protruding in the radial direction.

According to this configuration, the convex part is formed on the inner peripheral surface of the fitting member and the fitting member is inserted into the cylindrical part to be fitted to the protrusion part. Accordingly, since the rotating member of the manufacturing device for the high-pressure tank is fitted (locked) to the convex part formed on the inner peripheral surface of the fitting member, it is possible to transmit the rotational force generated by the manufacturing device for the high-pressure tank to the protrusion part.

Further, since the inner peripheral surface of the fitting member is provided with the convex part fitted (locked) to the rotating member of the manufacturing device for the high-pressure tank, it is possible to simplify the shape of the cylindrical part and to increase the productivity of the liner.

(9) According to an embodiment of the disclosure, there is provided a manufacturing method for a high-pressure tank including a liner (for example, liners 11, 71, 101, 121, and 151 of the embodiments), a reinforcing fiber layer (for example, a reinforcing fiber layer 12 of the embodiments) formed on an outer periphery of the liner, and a metal fitting (for example, a metal fitting 13 of the embodiments) attached to the liner and having a protrusion part (for example, protrusion parts 20, 72, 102, and 122 of the embodiments) provided in a part of a main body (for example, a liner main body 15 of the embodiments) of the liner to protrude in a direction moving away from the main body, the manufacturing method for the high-pressure tank including: an inserting step of inserting a rotating member (for example, rotating shafts 55, 81, 111, and 131 of the embodiments) rotating the liner into the liner; and a winding step of winding a fiber bundle (for example, a fiber bundle 14 of the embodiments) around the liner to obtain the reinforcing fiber layer, wherein in the inserting step, the rotating member is moved in an axial direction of the liner to be fitted to the protrusion part, and wherein the winding step is performed in a state being fitted.

According to this manufacturing method, the reinforcing fiber layer is obtained by fitting (locking) the rotating member to the protrusion part provided in a part of the main body of the liner, rotating the liner by the rotating member, and winding the fiber bundle around the liner. Accordingly, it is possible to perform high-speed FW molding without causing the idle rotation of the metal fitting or the deformation of the liner, for example, when performing high-speed FW molding using the manufacturing device for the high-pressure tank. Further, it is not necessary to form the idle rotation preventing unevenness in the metal fitting and to simplify the shape of the metal fitting. Accordingly, it is possible to increase the workability of the metal fitting.

(10) The manufacturing method for the high-pressure tank may further include a positioning step of positioning the rotating member and in the positioning step, a flange part (for example, a flange part 56 of the embodiments) provided in the rotating member may be positioned with respect to the metal fitting.

According to this manufacturing method, since the flange part provided in the rotating member is positioned to the metal fitting, it is possible to position the rotating member at the position fitted (locked) to the protrusion part. Accordingly, it is possible to reliably and easily fit (lock) the rotating member to the protrusion part and to increase the productivity of the high-pressure tank.

(11) The rotating member may further include a fitting member (for example, fitting bar members 116 and 136 of the embodiments) fitted to the protrusion part and the manufacturing method for the high-pressure tank may further include an unfolding step of unfolding the fitting member in the radial direction of the liner after inserting the fitting member into the liner.

According to this manufacturing method, the rotating member is provided with the fitting member fitted to the protrusion part and the fitting member is unfolded in the radial direction of the liner after the fitting member is inserted into the liner. Accordingly, it is possible to rotate the liner by the rotating member by fitting (locking) the fitting member to the protrusion part disposed in the inner space of the liner.

(12) According to an embodiment of the disclosure, there is provided a manufacturing device (for example, manufacturing devices 50, 80, 110, 130, and 170 of the embodiments) for a high-pressure tank including a liner (for example, liners 11, 71, 101, 121, and 151 of the embodiments), a reinforcing fiber layer (for example, a reinforcing fiber layer 12 of the embodiments) formed on an outer periphery (for example, outer peripheral surfaces 11a, 71a, 101a, 121a, and 151a of the embodiments) of the liner, and a metal fitting (for example, a metal fitting 13 of the embodiments) attached to the liner and having a protrusion part (for example, protrusion parts 20, 72, 102, and 122 of the embodiments) provided in a part of the main body (for example, a liner main body 15 of the embodiments) of the liner to protrude in a direction moving away from the main body, the manufacturing device for the high-pressure tank including: a holding unit (for example, a holding unit 51 of the embodiments) which holds the liner; a rotating unit (for example, a rotating unit 52 of the embodiments) which rotates the liner; and a winding unit (for example, a winding unit 53 of the embodiments) which winds a fiber bundle (for example, a fiber bundle 14 of the embodiments) around the liner to obtain the reinforcing fiber layer, wherein the rotating unit is provided with a fitting unit (for example, a fitting part 59 of the embodiments) having a fitting relationship with the protrusion part.

According to this manufacturing device, the fitting unit is provided in the rotating unit and the fitting unit is formed to engage with the protrusion part provided in the liner. Thus, it is possible to rotate the liner by fitting (locking) the fitting unit to the protrusion part. Accordingly, it is possible to perform high-speed FW molding without causing the idle rotation of the metal fitting or the deformation of the liner, for example, when performing high-speed FW molding using the manufacturing device for the high-pressure tank. Further, it is not necessary to form the idle rotation preventing unevenness in the metal fitting and to simplify the shape of the metal fitting. Accordingly, it is possible to increase the workability of the metal fitting.

(13) The fitting unit may further include an unfolding unit (for example, unfolding parts 115 and 135 of the embodiments) which unfolds the fitting unit in the radial direction of the liner after the fitting unit being inserted into the liner.

According to this manufacturing device, the fitting unit is provided with the unfolding unit and the unfolding unit is formed to be unfolded in the radial direction of the liner. Thus, it is possible to unfold the unfolding unit in the radial direction of the liner after inserting the fitting unit to the liner. Accordingly, it is possible to rotate the liner by the rotating member by fitting (locking) the fitting unit to the protrusion part disposed in the inner space of the liner.

According to the disclosure, it is possible to simplify the shape of the metal fitting and to perform high-speed filament winding (high-speed FW) molding without causing the idle rotation of the metal fitting or the deformation of the liner, for example, when performing the high-speed FW molding.

DESCRIPTION OF THE EMBODIMENTS

Hereinafter, a high-pressure tank, a manufacturing method for a high-pressure tank, and a manufacturing device for a high-pressure tank according to an embodiment of the disclosure will be described with reference to the drawings.

The application of the high-pressure tank is not particularly limited, but in the embodiment, for example, the high-pressure tank will be described as a fuel gas supply tank for a fuel cell vehicle. The high-pressure tank constitutes a part of a fuel cell system and supplies a fuel gas to a fuel cell. The fuel gas stored in the high-pressure tank is, for example, a flammable high-pressure gas such as a hydrogen gas or compressed natural gas.

First Embodiment

<High-Pressure Tank>

Figure 1:
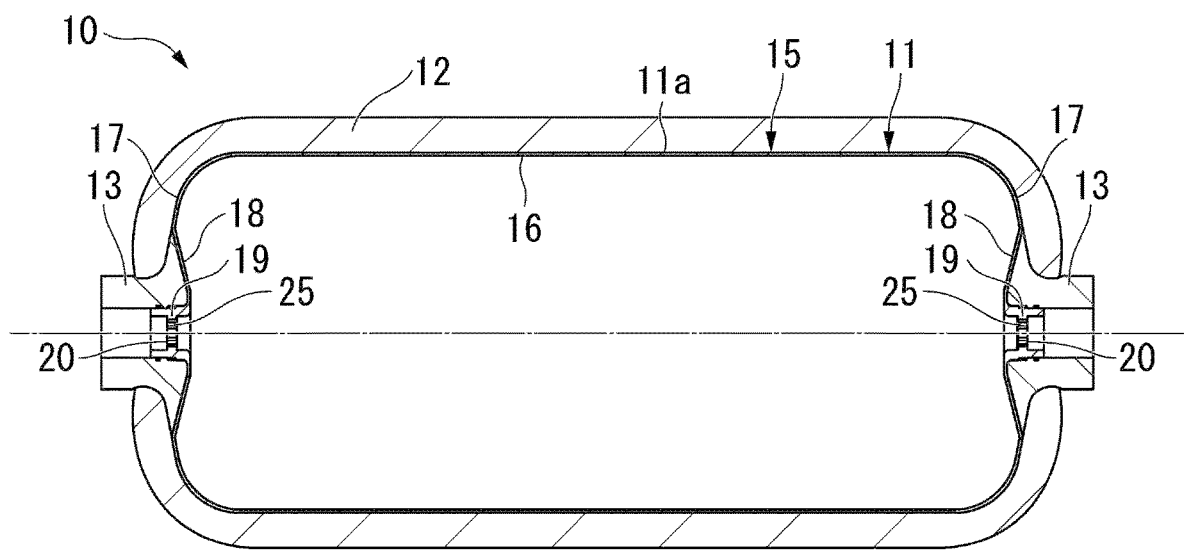
FIG. 1 is a cross-sectional view showing an overall high-pressure tank of a first embodiment according to the disclosure.
Figure 2:
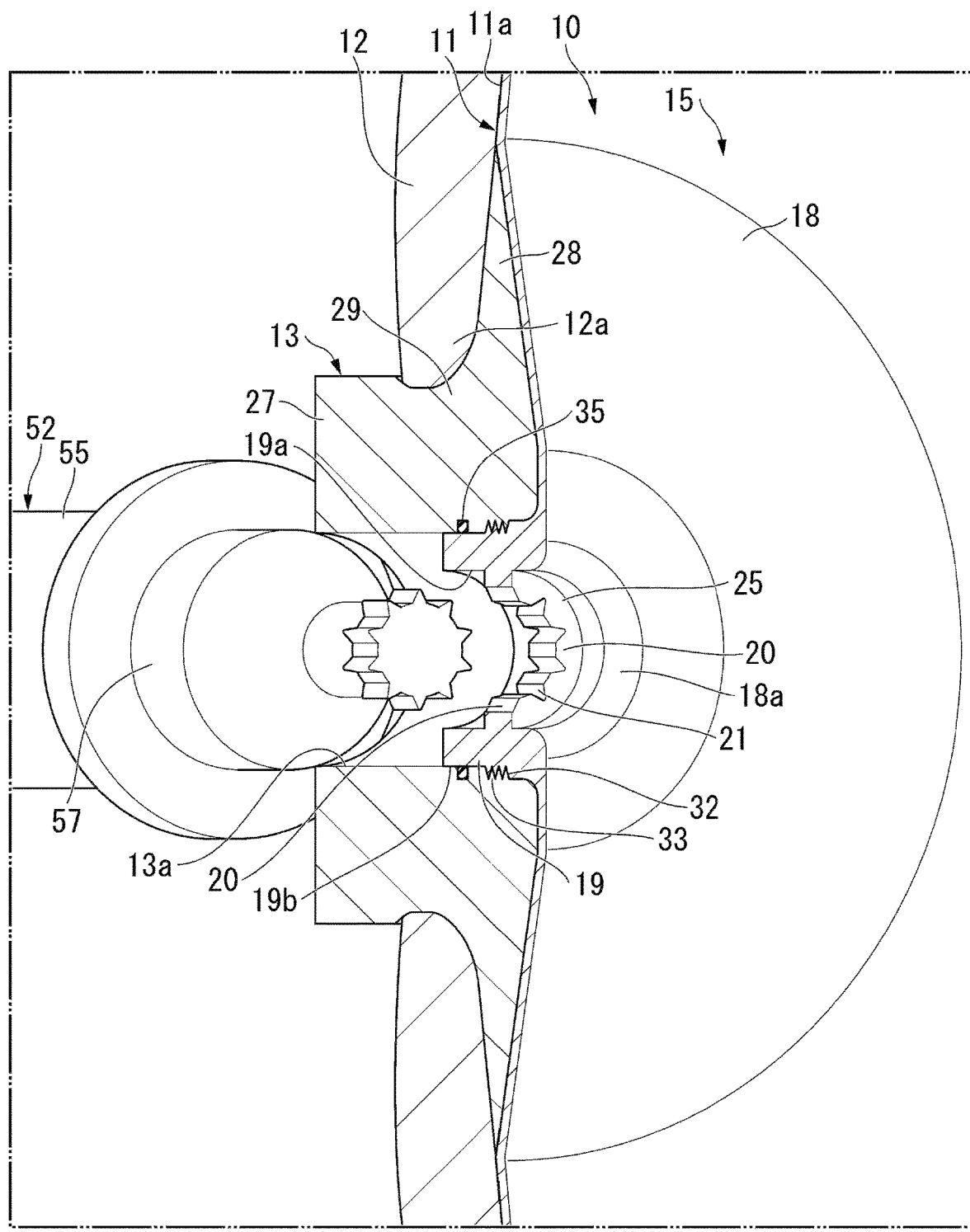
FIG. 2 is a perspective view showing the high-pressure tank and a manufacturing device of the first embodiment while the high-pressure tank is broken in a rotating shaft.

As shown in FIGS. 1 and 2, a high-pressure tank 10 includes a hollow liner 11, a reinforcing fiber layer 12 which is formed on an outer peripheral surface (outer periphery) 11a of the liner 11, and a metal fitting 13 which is attached to both end parts of the liner 11 in the axial direction. Hereinafter, the axial direction of the liner 11 may be simply referred to as the "axial direction". Further, the radial direction of the liner 11 may be simply referred to as the "radial direction".

The liner 11 is formed as a hollow body by, for example, a polyethylene resin, a polyamide resin, or another hard resin, an aluminum alloy, or another metal. The liner 11 includes a liner main body (main body) 15 and a protrusion part 20.

The liner main body 15 is formed as a hollow body of which an axial cross-section is substantially oval. The liner main body 15 includes a body part 16, dome parts 17, a recessed part 18, and a cylindrical part 19.

The body part 16 is formed in, for example, a cylindrical shape of which a radial cross-section is substantially circular. The dome parts 17 are provided on each of both outer sides of the body part 16 in the axial direction. The dome part 17 is formed in a substantially dome shape to gradually decrease in diameter from both axial sides of the body part 16 toward the outside of the body part 16.

The recessed part 18 is provided at each of both axial sides of the pair of dome parts 17. The recessed part 18 is coaxially provided at the front end of the dome part 17. The recessed part 18 is formed so that a center 18a is recessed in the axial direction from the front end of the dome part 17 toward the inside of the liner 11.

The cylindrical part 19 protrudes from the center 18a of each of the pair of recessed parts 18 toward the outside (the opposite side) of the body part 16 to have a diameter smaller than that of the body part 16. The cylindrical part 19 is formed in a columnar shape extending in the axial direction so that a radial cross-section is circular. The cylindrical part 19 includes a flange 25 which is formed on an inner peripheral surface (that is, an inner wall surface of the liner 11) 19a. The flange 25 is formed in an annular shape along the inner peripheral surface 19a of the cylindrical part 19.

The flange 25 is provided with a plurality of protrusion parts 20. Here, the cylindrical part 19 and the flange 25 are parts that constitute a part of the liner main body 15. Thus, the plurality of protrusion parts 20 is integrally molded with a part of the liner main body 15.

The plurality of protrusion parts 20 is continuously formed along the flange 25 at intervals in the circumferential direction of the inner peripheral surface 19a of the cylindrical part 19. The protrusion part 20 protrudes inward in the radial direction of the liner 11. In other words, the protrusion part 20 protrudes in a direction moving away from the liner main body 15.

Specifically, the protrusion part 20 protrudes in a V shape so that the projection width gradually decreases, for example, from the flange 25 toward the inside of the liner 11 in the radial direction when viewed from the axial direction of the liner 11. Further, a V-shaped concave part 21 is formed between the adjacent protrusion parts 20.

Additionally, the protrusion part 20 is not limited to the V shape (triangular shape) and may be formed in another shape such as a rectangular shape.

The metal fitting 13 is attached to the cylindrical part 19. The metal fitting 13 is formed of, for example, aluminum or an aluminum alloy and is formed in a substantially annular shape by, for example, die casting.

The metal fitting 13 includes, for example, a flange 27 which is formed at a front end side (on the outside of the liner 11 in the axial direction), an enlarged part 28 which is formed at a base end side (on the inside of the liner 11 in the axial direction), and a recessed part 29 which is formed between the enlarged part 28 and the flange 27 in the axial direction.

In the metal fitting 13, for example, a female screw 32 is formed on an inner peripheral surface 13a. In the metal fitting 13, for example, the female screw 32 is attached to the recessed part 18 and the cylindrical part 19 of the liner 11 by screw coupling to a male screw 33 of the cylindrical part 19. In this state, the enlarged part 28 of the metal fitting 13 is in close contact with the recessed part 18.

Further, a seal member (for example, an O-ring) 35 is interposed between an outer peripheral surface 19b of the cylindrical part 19 and an inner peripheral surface 13a of the metal fitting 13. Accordingly, a gap between the cylindrical part 19 and the metal fitting 13 is sealed by a seal member 35.

A reinforcing fiber layer 12 is formed on the metal fitting 13 and the liner 11 (specifically, the liner main body 15).

The reinforcing fiber layer 12 is formed in such a manner that a fiber bundle (reinforcing fiber) 14 (see FIG. 3) impregnated with a resin is wound around the outer peripheral surface 11a of the liner 11 and the recessed part 29 of the metal fitting 13, for example, by filament winding (FW) molding and the wound resin is cured. In this state, a front end part 12a of the reinforcing fiber layer 12 is in close contact with the recessed part 29 of the metal fitting 13.

As the resin of the reinforcing fiber layer 12, for example, an epoxy resin, a modified epoxy resin, an unsaturated polyester resin, or the like is used. Further, carbon fiber, metal fiber, or the like is used as the reinforcing fiber.

<High-Pressure Tank Manufacturing Device>

Figure 3:
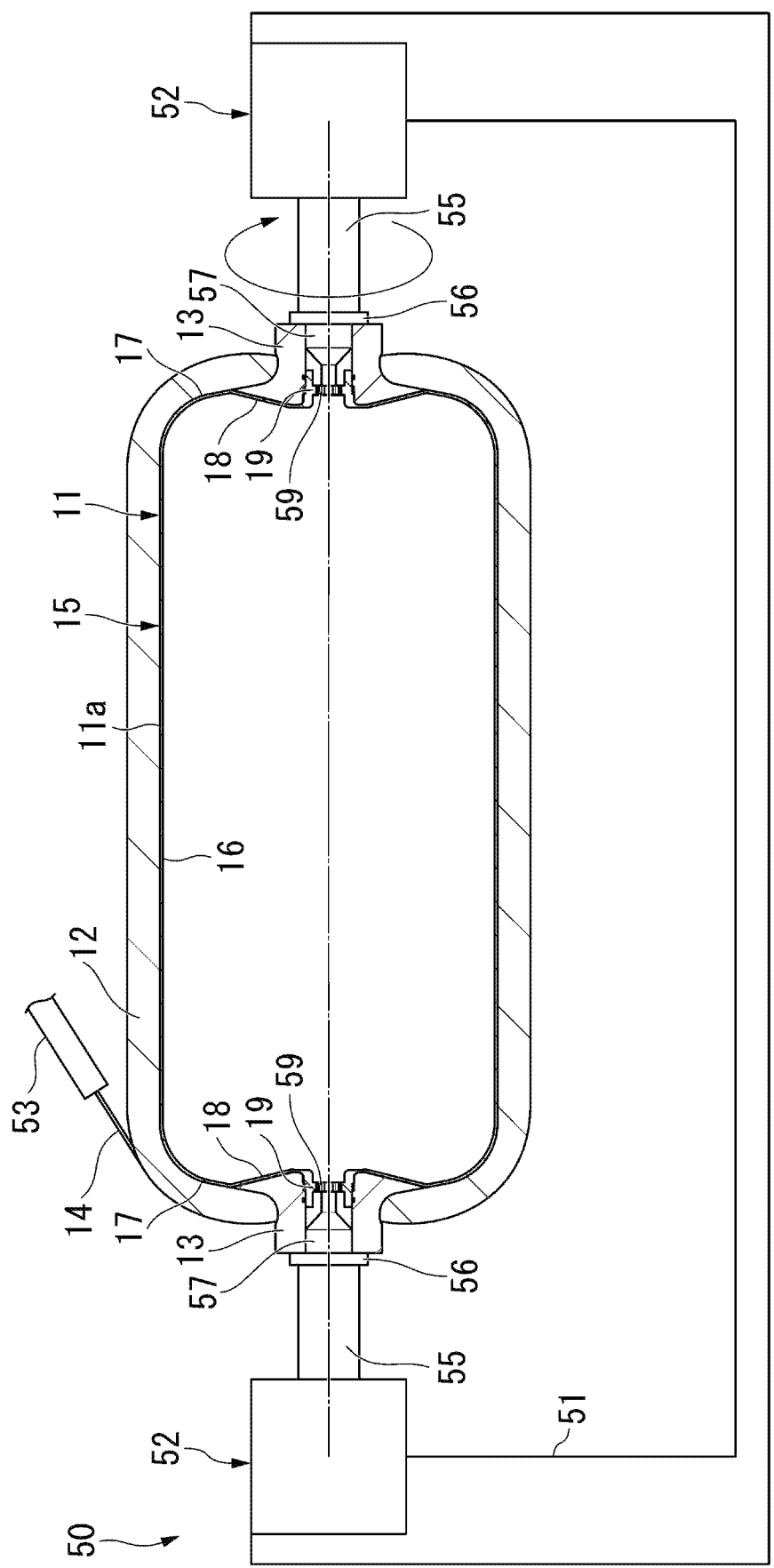
FIG. 3 is a schematic view showing a manufacturing device for a high-pressure tank of the first embodiment.
Figure 4:
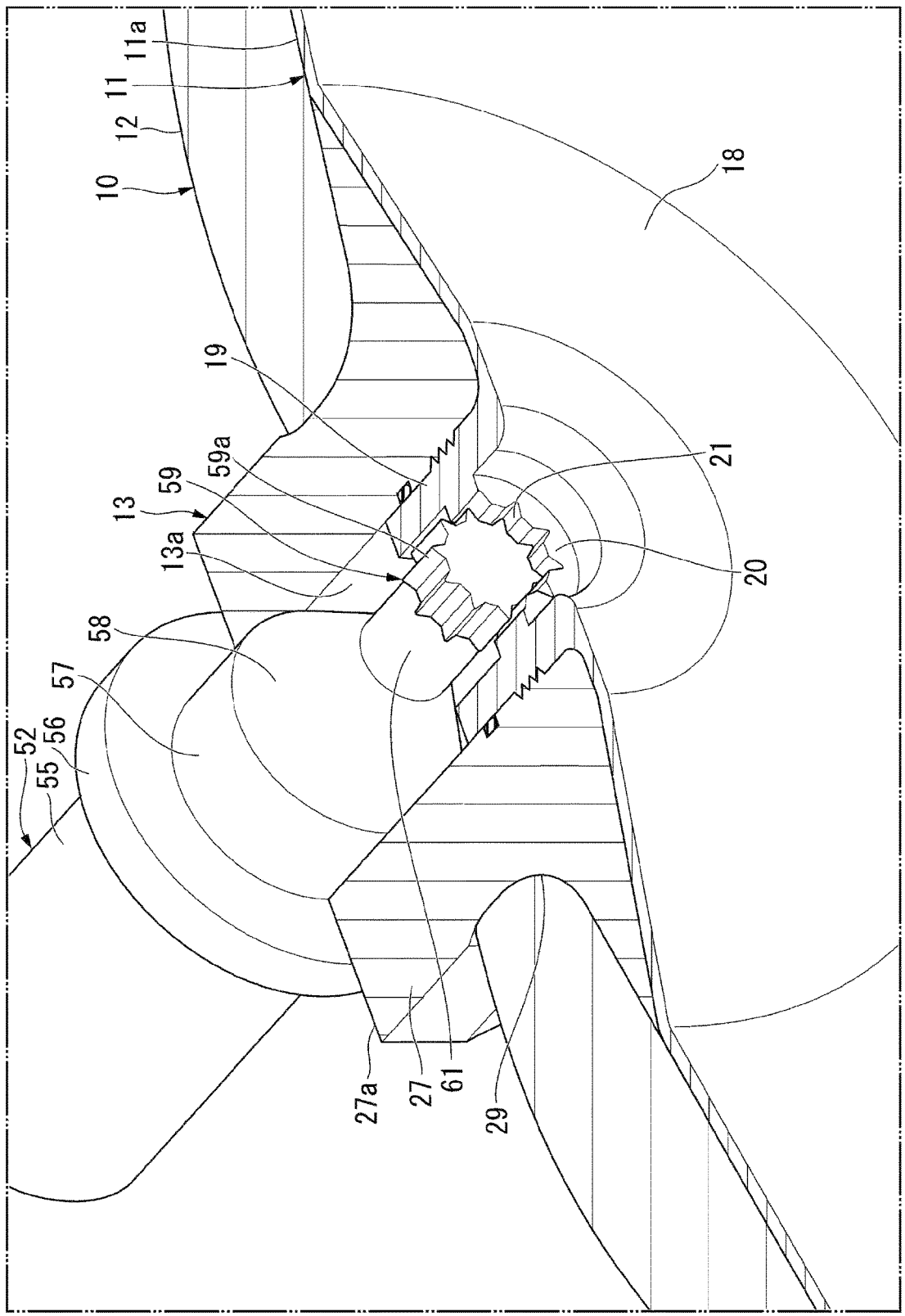
FIG. 4 is a perspective view showing a state in which a fitting part of the rotating shaft is fitted to the high-pressure tank of the first embodiment.

As shown in FIGS. 2 to 4, a manufacturing device 50 for a high-pressure tank is a filament winding device which forms the reinforcing fiber layer 12 by winding the fiber bundle 14 around the outer peripheral surface 11a of the liner 11 and the recessed part 29 of the metal fitting 13.

The manufacturing device 50 for the high-pressure tank includes a holding unit 51, a rotating unit 52, and a winding unit 53.

The holding unit 51 has a function of holding the liner 11 and the pair of metal fittings 13. Further, the winding unit 53 has a function of obtaining the reinforcing fiber layer 12 by winding the fiber bundle 14 around the liner 11. Further, the rotating unit 52 has a function of rotating the liner 11 and the pair of metal fittings 13.

Specifically, the rotating unit 52 includes a rotating shaft (rotating member) 55 which is insertable into the metal fitting 13 and the cylindrical part 19 from both sides of the liner 11. The rotating shaft 55 includes a flange part (positioning part) 56, a support part 57, an inclined part 58, and a fitting part (fitting unit) 59.

The flange part 56 is provided in the vicinity of the front end part of the rotating shaft 55. The flange part 56 is projected outward in the radial direction of the rotating shaft 55 from the rotating shaft 55. The flange part 56 comes into contact with, for example, the flange 27 (specifically, an end surface 27a of the flange 27) of the metal fitting 13 while a fitting part 59 is inserted into the cylindrical part 19 so that the flange part 56 is positioned to the metal fitting 13. Accordingly, it is possible to position a fitting part 59 of the rotating shaft 55 to a fitting position.

The support part 57 is provided at the front end side of the rotating shaft 55 with respect to the flange part 56. In a state in which the support part 57 is inserted into the metal fitting 13, the outer peripheral surface is in contact with the inner peripheral surface 13a of the metal fitting 13. Accordingly, the metal fitting 13 and the liner 11 are supported by the support part 57. The support part 57 is provided with the inclined part 58.

The inclined part 58 is formed to gradually decrease in diameter from the support part 57 toward the front end part of the rotating shaft 55. A small diameter part 61 is provided at the front end of the inclined part 58. The fitting part 59 is formed at the front end part of the small diameter part 61 (that is, the front end part of the rotating shaft 55).

The fitting part 59 is formed to be insertable into the cylindrical part 19 and to have a fitting relationship with the plurality of protrusion parts 20. Specifically, the fitting part 59 includes a plurality of fitting protrusion parts 59a which is fitted to the plurality of protrusion parts 20.

The plurality of fitting protrusion parts 59a is continuously formed along the outer peripheral surface of the small diameter part 61 at intervals in the circumferential direction. The fitting protrusion part 59a protrudes outward in the radial direction of the small diameter part 61. That is, the fitting protrusion part 59a protrudes in a V shape, for example, so that the projection width gradually decreases outward in the radial direction of the small diameter part 61 from the outer peripheral surface of the small diameter part 61 when viewed from the axial direction of the rotating shaft 55.

The plurality of fitting protrusion parts 59a is inserted into the plurality of protrusion parts 20 formed in an annular shape and is fitted to the concave parts 21 between the adjacent protrusion parts 20. Thus, the plurality of fitting protrusion parts 59a is arranged to mesh with the plurality of protrusion parts 20. That is, the fitting part 59 is fitted (locked) to the plurality of protrusion parts 20 in the rotation direction of the rotating shaft 55.

Thus, the rotation of the rotating shaft 55 is transmitted to the plurality of protrusion parts 20 through the fitting part 59. Accordingly, it is possible to rotate the metal fitting 13 and the liner 11 by the rotation of the rotating shaft 55.

<High-Pressure Tank Manufacturing Method>

Next, a method of manufacturing the high-pressure tank 10 by the manufacturing device 50 for the high-pressure tank will be described with reference to FIGS. 2 to 4.

As shown in FIG. 2, in an inserting step, the rotating shaft 55 is moved in the axial direction of the liner 11 and the rotating shaft 55 is inserted into the metal fitting 13 and the cylindrical part 19 of the liner 11. By inserting the rotating shaft 55 thereinto, the outer peripheral surface of the support part 57 contacts the inner peripheral surface 13a of the metal fitting 13 and the metal fitting 13 and the liner 11 are supported by the rotating shaft 55. Further, the fitting part 59 is fitted to the plurality of concave parts 21.

As shown in FIG. 4, the fitting part 59 fitted to the plurality of concave parts 21 is meshed with the plurality of protrusion parts 20. Accordingly, the fitting part 59 is fitted (locked) to the plurality of protrusion parts 20 in the rotation direction of the rotating shaft 55.

Next, in a positioning step, the flange part 56 of the rotating shaft 55 is brought into contact with the metal fitting 13 (specifically, the end surface 27a of the flange 27). Accordingly, the fitting part 59 is positioned at a fitting position fitted (locked) to the plurality of protrusion parts 20.

Next, in a winding step, the rotating shaft 55 is rotated to rotate the metal fitting 13 and the liner 11. In this state, as shown in FIG. 3, the fiber bundle 14 is wound around the outer peripheral surface 11a of the liner 11 or the recessed part 29 of the metal fitting 13 by the winding unit 53 to form the reinforcing fiber layer 12.

As described above, according to the high-pressure tank 10, the manufacturing device 50 for the high-pressure tank, and the manufacturing method for the high-pressure tank of the first embodiment, the plurality of protrusion parts 20 is provided in a part of the liner main body 15 (specifically, the flange 25 of the cylindrical part 19). Further, the protrusion part 20 protrudes in a direction moving away from the flange 25. Thus, the rotating shaft 55 (specifically, the fitting part 59) of the manufacturing device 50 for the high-pressure tank can be fitted (locked) to the protrusion part 20 of the liner 11. That is, the rotational force generated by the manufacturing device 50 for the high-pressure tank can be directly transmitted to the liner 11 without using the metal fitting 13.

Accordingly, for example, when performing high-speed filament winding (high-speed FW) molding using the manufacturing device 50 for the high-pressure tank, the high-speed FW molding can be performed without causing the idle rotation of the metal fitting 13 or the deformation of the liner 11.

Further, it is not necessary to form an idle rotation preventing unevenness in the metal fitting 13 and it is possible to simplify the shape of the metal fitting 13. Accordingly, it is possible to increase the workability of the metal fitting 13.

Further, the plurality of protrusion parts 20 protrudes inward in the radial direction of the cylindrical part 19. Accordingly, it is possible to easily and reliably fit (lock) the fitting part 59 of the rotating shaft 55 to the plurality of protrusion parts 20 by inserting the rotating shaft 55 of the manufacturing device 50 for the high-pressure tank in the axial direction of the liner 11.

Further, it is possible to easily mold, for example, the resinous liner 11 by projecting the plurality of protrusion parts 20 inward in the radial direction of the cylindrical part 19.

Moreover, since the plurality of protrusion parts 20 is continuously provided at intervals in the circumferential direction of the cylindrical part 19, it is possible to further reliably fit (lock) the fitting part 59 to the plurality of protrusion parts 20. Accordingly, it is possible to further efficiently transmit the rotational force generated by the rotating shaft 55 to the liner 11 through the plurality of protrusion parts 20.

Further, the protrusion part 20 was formed in the cylindrical part 19 by projecting the cylindrical part 19 from the recessed part 18 of the liner 11 toward the outside of the liner 11. Accordingly, it is possible to easily fit (lock) the fitting part 59 of the rotating shaft 55 to the protrusion part 20.

Moreover, the flange part 56 of the rotating shaft 55 is brought into contact with the metal fitting 13 (specifically, the end surface 27a of the flange 27) to be positioned at the fitting position in which the fitting part 59 is fitted (locked) to the plurality of protrusion parts 20. Accordingly, it is possible to reliably and easily fit (lock) the rotating shaft 55 to the protrusion part 20 and to increase the productivity of the high-pressure tank 10.

Next, high-pressure tanks, manufacturing devices for high-pressure tanks, and manufacturing methods for high-pressure tanks of a second embodiment to a fifth embodiment will be described with reference to FIGS. 5 to 16. Additionally, in the second embodiment to the fifth embodiment, a detailed description of the same and similar members and steps as and to those of the high-pressure tank, the manufacturing device for the high-pressure tank, and the manufacturing method for the high-pressure tank of the first embodiment will be omitted by using the same reference numeral and steps.

Second Embodiment

<High-Pressure Tank>

Figure 5:
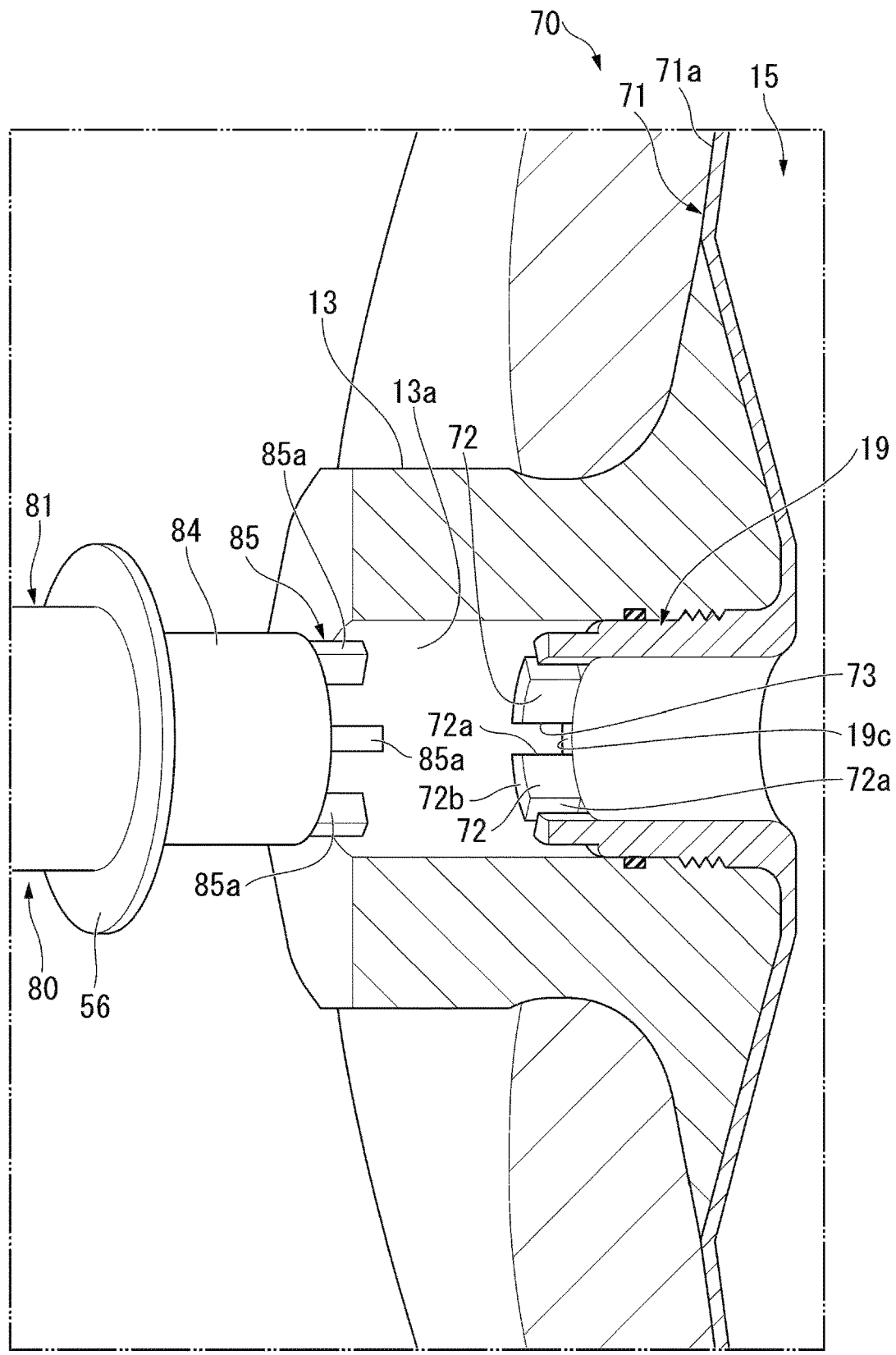
FIG. 5 is a perspective view showing a high-pressure tank and a manufacturing device of a second embodiment according to the disclosure while the high-pressure tank is broken in a rotating shaft as viewed from the rotating shaft side.

As shown in FIG. 5, a high-pressure tank 70 is the same as the high-pressure tank 10 of the first embodiment except that a liner 71 is provided instead of the liner 11 of the first embodiment and a protrusion part 72 is provided in the liner 71 instead of the protrusion part 20 of the first embodiment. That is, the liner 71 includes a plurality of protrusion parts 72.

The plurality of protrusion parts 72 is continuously formed on a front end surface (front end) 19c of the cylindrical part 19 at intervals in the circumferential direction of the cylindrical part 19. The plurality of protrusion parts 72 is integrally molded with the cylindrical part 19 (that is, a part of the liner main body 15). The protrusion part 72 protrudes from the front end surface 19c of the cylindrical part 19 toward the outside of the cylindrical part 19 (that is, the outside of the liner 71 in the axial direction).

Specifically, the protrusion part 72 is formed with, for example, a curved cross-section. The protrusion part 72 is formed in a rectangular shape when viewed from the radial direction, for example, in such a manner that both projection side surfaces 72a extend in parallel in the axial direction and a projection end surface 72b extends in a direction orthogonal to both projection side surfaces 72a.

Further, the plurality of protrusion parts 72 is continuously formed at intervals in the circumferential direction of the cylindrical part 19 so that a rectangular concave part 73 is formed between the adjacent protrusion parts 72.

Additionally, the protrusion part 72 is not limited to the rectangular shape and may have another shape such as a V shape (triangular shape).

<High-Pressure Tank Manufacturing Device>

Figure 6:
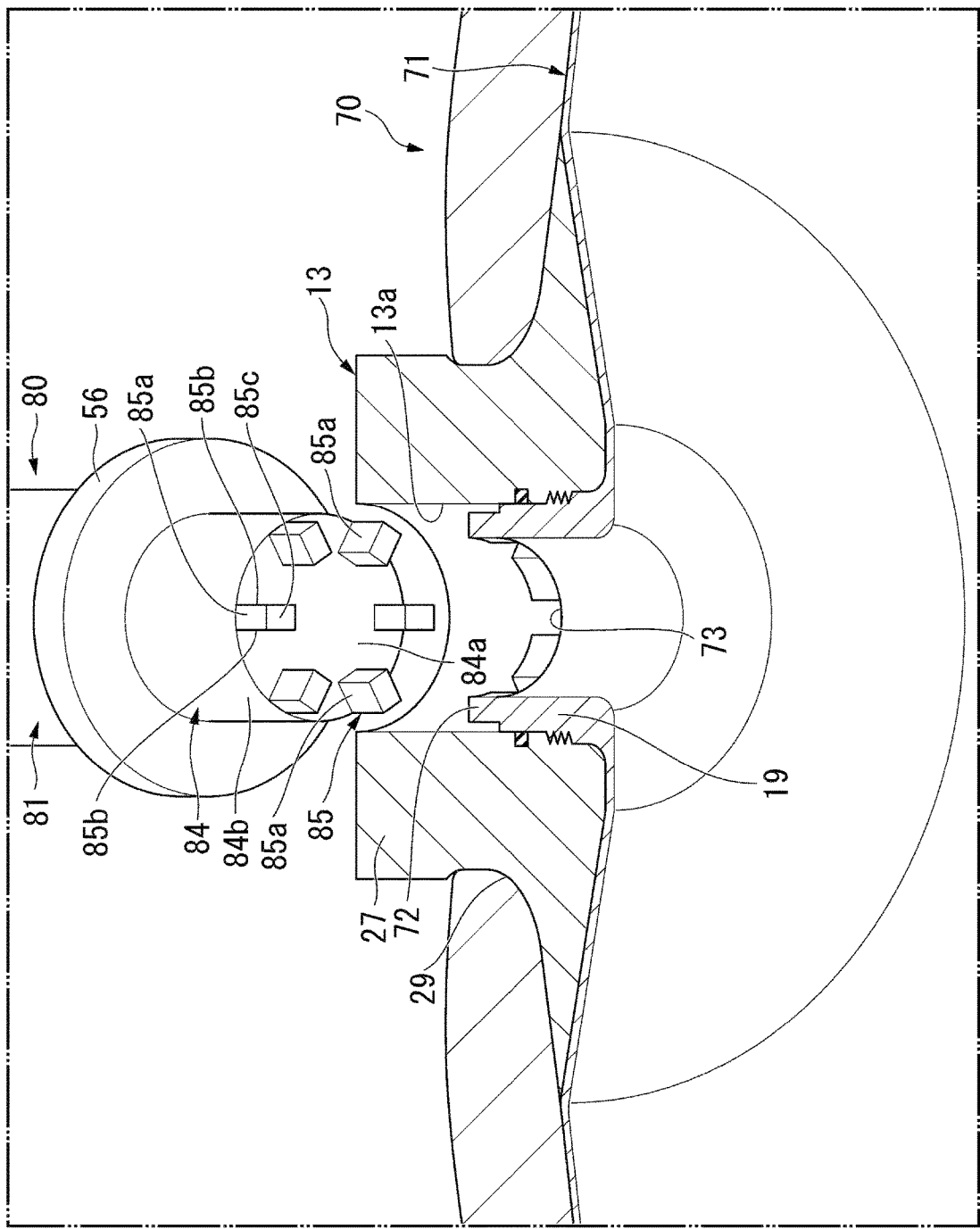
FIG. 6 is a perspective view showing the high-pressure tank and the manufacturing device of the second embodiment while the high-pressure tank is broken in the rotating shaft as viewed from the high-pressure tank side.

As shown in FIGS. 5 and 6, a manufacturing device 80 for a high-pressure tank is the same as the manufacturing device 50 for the high-pressure tank of the first embodiment except that a rotating shaft (rotating member) 81 is provided instead of the rotating shaft 55 of the first embodiment.

The rotating shaft 81 includes a support part 84 and a fitting part 85 instead of the support part 57, the inclined part 58, and the fitting part 59 of the first embodiment.

The support part 84 is provided at the front end side of the rotating shaft 81 with respect to the flange part 56. In a state in which the support part 84 is inserted into the metal fitting 13, the outer peripheral surface contacts the inner peripheral surface 13a of the metal fitting 13. Accordingly, the metal fitting 13 and the liner 71 are supported by the support part 84.

The fitting part 85 is formed on a front end surface 84a of the support part 84 (that is, the front end surface of the rotating shaft 81).

The fitting part 85 is formed to be insertable into the metal fitting 13 and to have a fitting relationship with the plurality of protrusion parts 72. Specifically, the fitting part 85 includes a plurality of fitting protrusion parts 85a which is fitted to the plurality of protrusion parts 72.

The plurality of fitting protrusion parts 85a is continuously formed along an outer circumferential edge 84b in the front end surface 84a of the support part 84 at intervals in the circumferential direction of the support part 84. The fitting protrusion part 85a protrudes in the axial direction of the support part 84. That is, the fitting protrusion part 85a is formed in a rectangular shape when viewed from the radial direction of the support part 84, for example, in such a manner that both protrusion side surfaces 85b extend in parallel in the axial direction and a protrusion end surface 85c extends in a direction orthogonal to both protrusion side surfaces 85b.

The plurality of fitting protrusion parts 85a is fitted to the concave parts 73 between the plurality of protrusion parts 72 arranged in an annular shape. Thus, the plurality of fitting protrusion parts 85a is arranged to mesh with the plurality of protrusion parts 72. That is, the fitting part 85 is fitted (locked) to the plurality of protrusion parts 72 in the rotation direction of the rotating shaft 81.

Thus, the rotation of the rotating shaft 81 is transmitted to the plurality of protrusion parts 72 through the fitting part 85. Accordingly, it is possible to rotate the metal fitting 13 and the liner 71 by the rotation of the rotating shaft 81.

<High-Pressure Tank Manufacturing Method>

Next, a method of manufacturing the high-pressure tank 70 by the manufacturing device 80 for the high-pressure tank will be described with reference to FIGS. 6 and 7.

As shown in FIG. 6, in the inserting step, the rotating shaft 81 is moved in the axial direction of the liner 71 and the support part 84 of the rotating shaft 81 is inserted into the metal fitting 13. By inserting the rotating shaft 81 thereinto, the outer peripheral surface of the support part 84 contacts the inner peripheral surface 13a of the metal fitting 13 and the metal fitting 13 and the liner 71 are supported by the rotating shaft 81. Further, the fitting part 85 is fitted to the plurality of concave parts 73.

Figure 7:
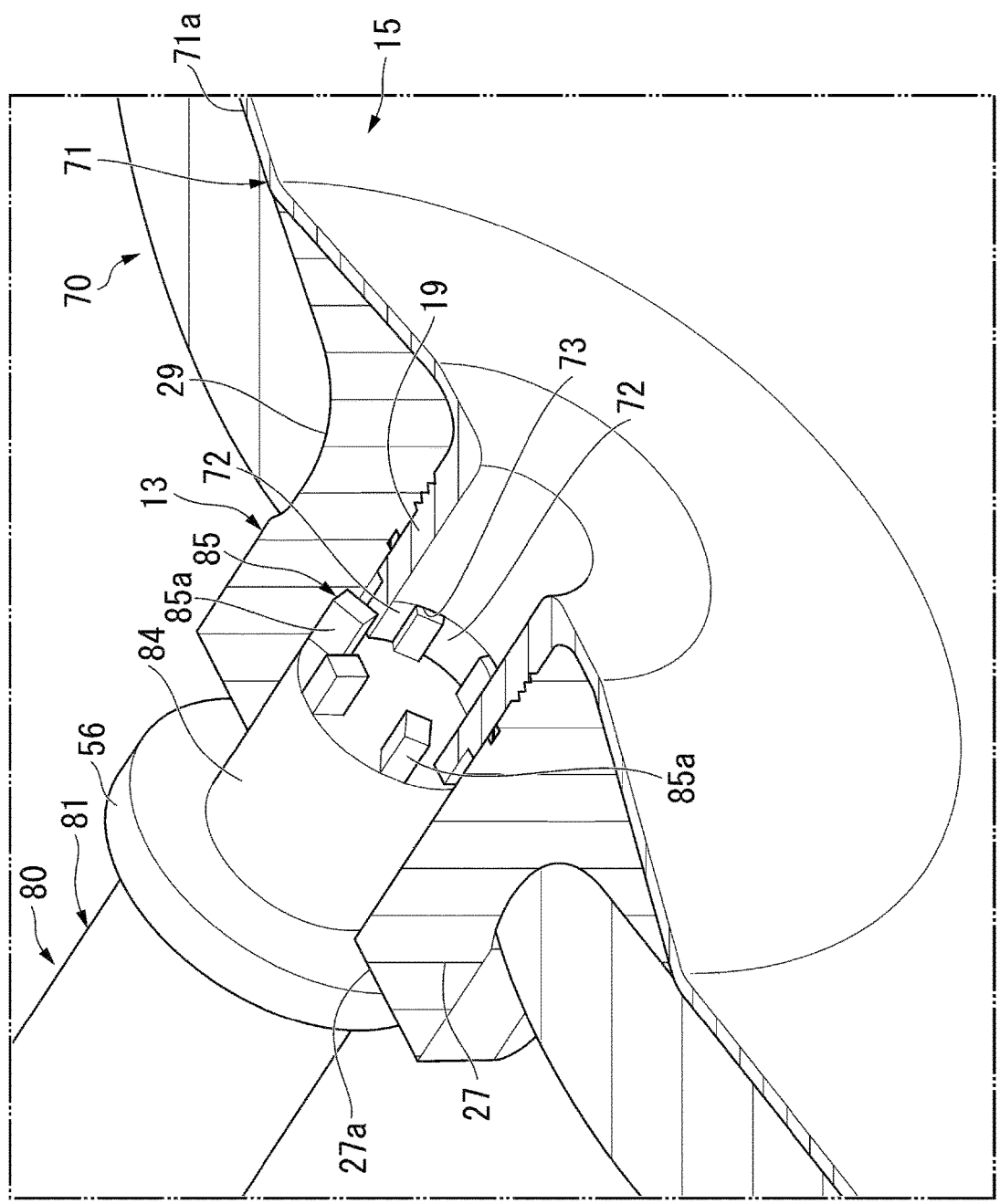
FIG. 7 is a perspective view showing a state in which a fitting part of the rotating shaft is fitted to the high-pressure tank of the second embodiment.

As shown in FIG. 7, the fitting part 85 fitted to the plurality of concave parts 73 is meshed with the plurality of protrusion parts 72. Accordingly, the fitting part 85 is fitted (locked) to the plurality of protrusion parts 72 in the rotation direction of the rotating shaft 81.

Next, in the positioning step, the flange part 56 of the rotating shaft 81 comes into contact with the metal fitting 13 (specifically, the end surface 27a of the flange 27). Accordingly, the flange part 56 is positioned to the metal fitting 13 and the fitting part 85 is positioned at the fitting position fitted (locked) to the plurality of protrusion parts 72.

Next, in the winding step, the rotating shaft 81 is rotated to rotate the metal fitting 13 and the liner 71. In this state, the fiber bundle 14 (see FIG. 3) is wound around an outer peripheral surface (outer periphery) 71a of the liner 71 or the recessed part 29 of the metal fitting 13 by the winding unit 53 shown in FIG. 3 to form the reinforcing fiber layer 12.

As described above, according to the high-pressure tank 70, the manufacturing device 80 for the high-pressure tank, and the manufacturing method for the high-pressure tank of the second embodiment, the plurality of protrusion parts 72 was provided in a part (specifically, the cylindrical part 19) of the liner main body 15. Further, the protrusion part 72 protruded in a direction moving away from the cylindrical part 19. Thus, it is possible to fit (lock) the rotating shaft 81 (specifically, the fitting part 85) of the manufacturing device 80 for the high-pressure tank to the protrusion part 72 of the liner 71. That is, it is possible to directly transmit the rotational force generated by the manufacturing device 80 for the high-pressure tank to the liner 71 without using the metal fitting 13.

Accordingly, it is possible to perform the high-speed FW molding without causing the idle rotation of the metal fitting 13 or the deformation of the liner 11, for example, when performing the high-speed FW molding using the manufacturing device 80 for the high-pressure tank.

Further, it is not necessary to form the idle rotation preventing unevenness in the metal fitting 13 and it is possible to simplify the shape of the metal fitting 13. Accordingly, it is possible to increase the workability of the metal fitting 13.

Moreover, the plurality of protrusion parts 72 protruded from the front end surface 19c of the cylindrical part 19 toward the outside of the cylindrical part 19 in the axial direction of the liner 71. Accordingly, since the rotating shaft 81 is inserted in the axial direction of the liner 71, it is possible to easily and reliably fit (lock) the fitting part 85 of the rotating shaft 81 to the plurality of protrusion parts 72.

Further, it is possible to easily mold, for example, the resinous liner 71 by projecting the plurality of protrusion parts 72 outward in the axial direction from the front end surface 19c of the cylindrical part 19.

Moreover, since the plurality of protrusion parts 72 is continuously provided at intervals in the circumferential direction of the cylindrical part 19, it is possible to further reliably fit (lock) the fitting part 85 to the plurality of protrusion parts 72. Accordingly, it is possible to further efficiently transmit the rotational force generated by the rotating shaft 81 to the liner 71 through the plurality of protrusion parts 72.

Further, the protrusion part 72 was formed in the cylindrical part 19 by projecting the cylindrical part 19 from the recessed part 18 of the liner 71 toward the outside of the liner 71. Accordingly, it is possible to easily fit (lock) the fitting part 85 of the rotating shaft 81 to the protrusion part 72.

Moreover, the flange part 56 of the rotating shaft 81 is brought into contact with the metal fitting 13 (specifically, the end surface 27a of the flange 27) to be positioned at the fitting position in which the fitting part 85 is fitted (locked) to the plurality of protrusion parts 72. Accordingly, it is possible to reliably and easily fit (lock) the rotating shaft 81 to the protrusion part 72 and to increase the productivity of the high-pressure tank 70.

Third Embodiment

<High-Pressure Tank>

Figure 8:
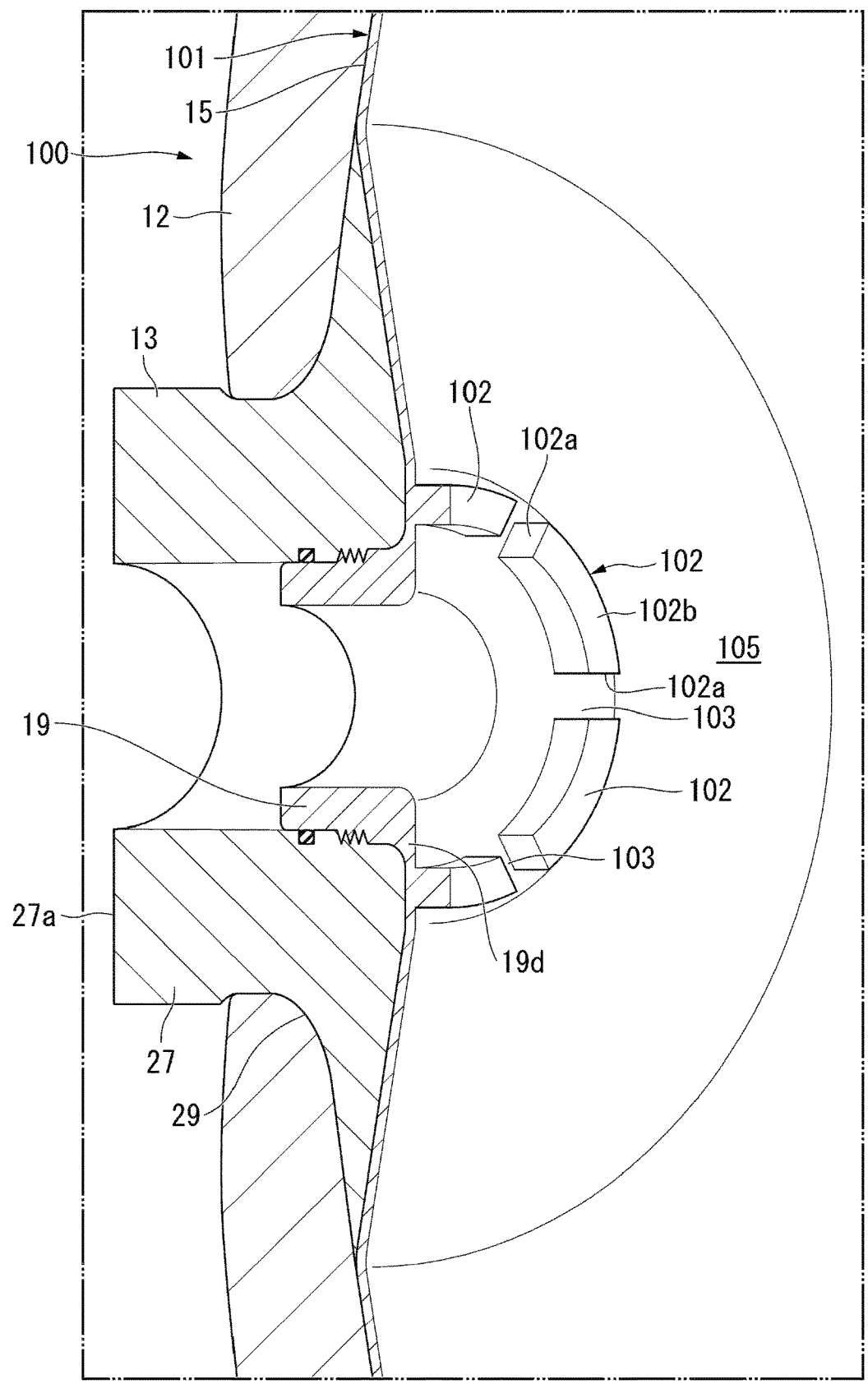
FIG. 8 is a perspective view showing a state in which a high-pressure tank of a third embodiment according to the disclosure is broken.

As shown in FIG. 8, a high-pressure tank 100 is the same as the high-pressure tank 10 of the first embodiment except that a liner 101 is provided instead of the liner 11 of the first embodiment and a protrusion part 102 is provided in the liner 101 instead of the protrusion part 20 of the first embodiment. That is, the liner 101 includes the plurality of protrusion parts 102.

The plurality of protrusion parts 102 is continuously formed in a base end part 19d of the cylindrical part 19 at intervals in the circumferential direction of the cylindrical part 19. The plurality of protrusion parts 102 is integrally molded with the cylindrical part 19 (that is, a part of the liner main body 15). The protrusion part 102 protrudes from the base end part 19d of the cylindrical part 19 toward the outside of the cylindrical part 19 (that is, an inner space 105 of the dome part 17) in the axial direction of the liner 101. That is, the protrusion part 102 protrudes in a direction moving away from the inner peripheral surface 19a of the cylindrical part 19.

In other words, the protrusion part 102 protrudes inward in the axial direction of the liner 101 from the base end part 19d of the cylindrical part 19. Accordingly, the plurality of protrusion parts 102 is arranged in the inner space 105 of the dome part 17.

Specifically, the protrusion part 102 is formed in a curved shape, for example, when viewed from the axial direction. The protrusion part 102 is formed in a rectangular shape when viewed from the radial direction, for example, in such a manner that both projection side surfaces 102a extend in parallel in the axial direction and the projection end surface 102b extends in a direction orthogonal to both projection side surfaces 102a.

Further, the plurality of protrusion parts 102 is continuously formed at intervals in the circumferential direction of the cylindrical part 19 so that a rectangular concave part 103 is formed between the adjacent protrusion parts 102.

Additionally, the protrusion part 102 is not limited to the rectangular shape and may have another shape such as a V shape (triangular shape).

<High-Pressure Tank Manufacturing Device>

Figure 9:
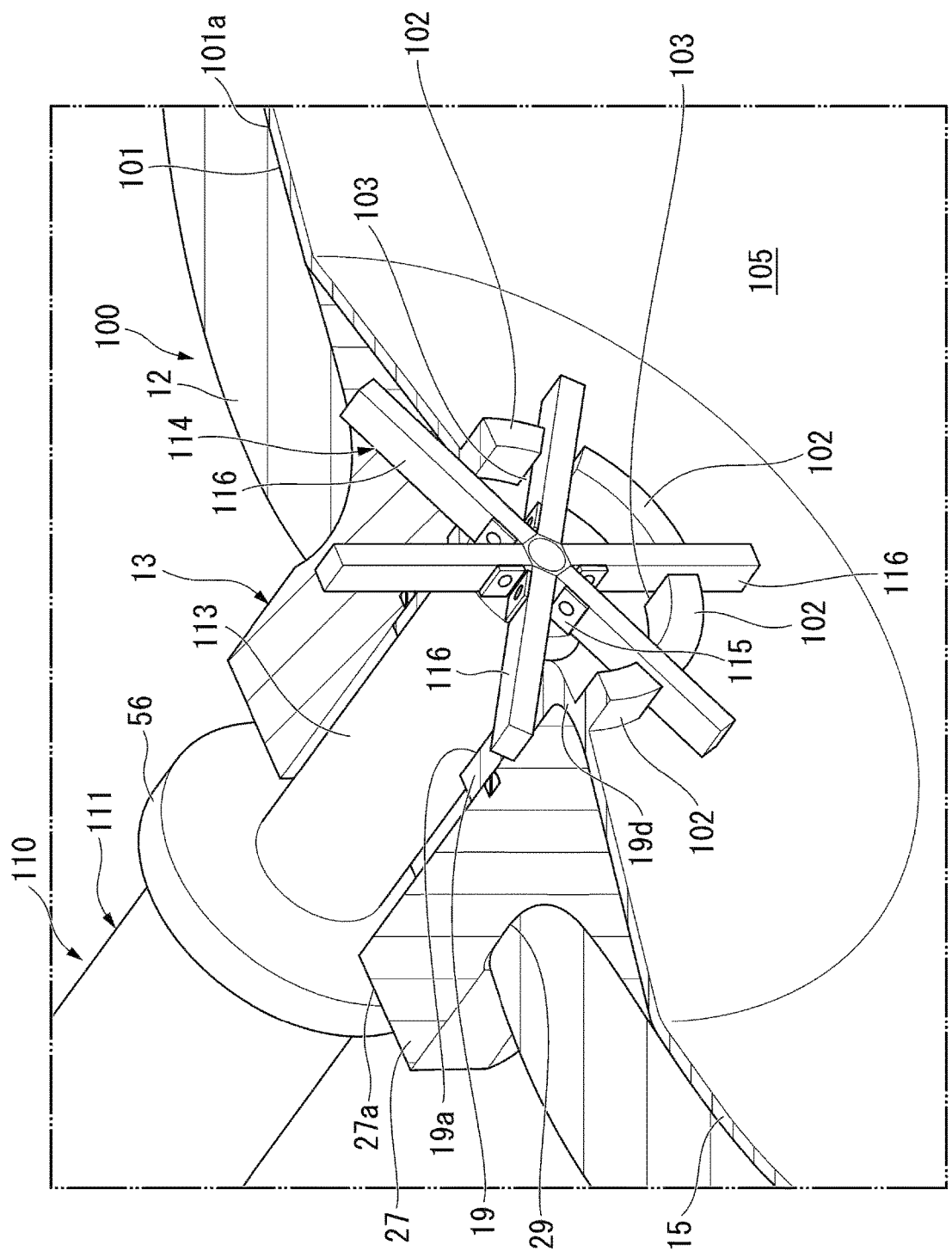
FIG. 9 is a perspective view showing a state in which a fitting part of a rotating shaft is fitted to the high-pressure tank of the third embodiment.

As shown in FIG. 9, a manufacturing device 110 for a high-pressure tank is the same as the manufacturing device 50 for the high-pressure tank of the first embodiment except that a rotating shaft (rotating member) 111 is provided instead of the rotating shaft 55 of the first embodiment.

A rotating shaft 111 includes a support part 113 and a fitting part 114 instead of the support part 57, the inclined part 58, and the fitting part 59 of the first embodiment.

The support part 113 is provided at the front end side of the rotating shaft 111 with respect to the flange part 56. In a state in which the support part 113 is inserted into the metal fitting 13 and the cylindrical part 19, the outer peripheral surface contacts the inner peripheral surface 19a of the cylindrical part 19. Accordingly, the liner 101 is supported by the support part 113.

The fitting part 114 is provided at the front end part of the support part 113 (that is, the front end part of the rotating shaft 111).

The fitting part 114 includes an unfolding part (unfolding unit) 115 and a plurality of fitting bar members (fitting members) 116.

The unfolding part 115 is provided at the front end part of the support part 113. The unfolding part 115 is provided with the plurality of fitting bar members 116.

Specifically, the base end parts of the plurality of fitting bar members 116 are attached to the unfolding part 115. The unfolding part 115 has a function of selectively arranging the plurality of fitting bar members 116 between the unfolding position and the folding position.

That is, the plurality of fitting bar members 116 is arranged radially outward in the radial direction with respect to the axis of the support part 113 by being unfolded at the unfolding position, for example, by the operation of the unfolding part 115. The plurality of fitting bar members 116 can be fitted to the concave parts 103 between the plurality of protrusion parts 102 while being arranged radially.

Further, the plurality of fitting bar members 116 is folded at the folding position, for example, by the operation of the unfolding part 115 to be arranged inside the cylindrical shape formed on the extension line of the outer peripheral surface of the support part 113. Thus, the plurality of fitting bar members 116 is insertable into the cylindrical part 19 together with the support part 113 while being arranged at the folding position.

Accordingly, it is possible to insert the fitting part 114 into the inner space 105 of the dome part 17 by inserting the front end part of the support part 113 into the inner space (specifically, the inner space 105 of the dome part 17) of the liner main body 15 while folding the plurality of fitting bar members 116 at the folding position. In this state, the plurality of fitting bar members 116 is unfolded at the unfolding position so that the plurality of fitting bar members 116 unfolded in the radial direction is fitted to the concave parts 103 between the plurality of protrusion parts 102.

Thus, the plurality of fitting bar members 116 is arranged to be meshed with the plurality of protrusion parts 102. That is, the fitting part 114 is fitted (locked) to the plurality of protrusion parts 102 in the rotation direction of the rotating shaft 111. Thus, the rotation of the rotating shaft 111 is transmitted to the plurality of protrusion parts 102 through the fitting part 114. Accordingly, it is possible to rotate the metal fitting 13 and the liner 101 by the rotation of the rotating shaft 111.

<High-Pressure Tank Manufacturing Method>

Next, a method of manufacturing the high-pressure tank 100 by the manufacturing device 110 for the high-pressure tank will be described with reference to FIG. 9.

As shown in FIG. 9, in the inserting step, first, the unfolding part 115 of the fitting part 114 is operated to fold the plurality of fitting bar members 116 at the folding position. In this state, the rotating shaft 111 is moved in the axial direction of the liner 101 and the support part 113 of the rotating shaft 111 is inserted into the metal fitting 13 and the cylindrical part 19.

By inserting the rotating shaft 111 thereinto, the outer peripheral surface of the support part 113 contacts the inner peripheral surface 19a of the cylindrical part 19 and the liner 101 and the metal fitting 13 are supported by the rotating shaft 111. Further, the fitting part 114 is inserted into the liner main body 15 (specifically, the inner space 105 of the dome part 17) together with the support part 113.

Next, in the positioning step, the flange part 56 of the rotating shaft 111 comes into contact with the metal fitting 13 (specifically, the end surface 27a of the flange 27). Accordingly, the flange part 56 is positioned to the metal fitting 13 and the fitting part 114 is positioned while being disposed (inserted) in the inner space 105 of the dome part 17.

Next, in the unfolding step, the unfolding part 115 of the fitting part 114 is operated after inserting the fitting part 114 so that the plurality of fitting bar members 116 is unfolded at the unfolding position to be radially arranged in the radial direction of the liner 101. The plurality of fitting bar members 116 arranged radially is fitted to the plurality of concave parts 103 and is meshed with the plurality of protrusion parts 102. Accordingly, the plurality of fitting bar members 116 is fitted (locked) to the plurality of protrusion parts 102 in the rotation direction of the rotating shaft 111.

Next, in the winding step, the rotating shaft 111 is rotated to rotate the metal fitting 13 and the liner 101. In this state, the fiber bundle 14 (see FIG. 3) is wound around an outer peripheral surface (outer periphery) 101a of the liner 101 or the recessed part 29 of the metal fitting 13 by the winding unit 53 shown in FIG. 3 to form the reinforcing fiber layer 12.

As described above, according to the high-pressure tank 100, the manufacturing device 110 for the high-pressure tank, and the manufacturing method for the high-pressure tank of the third embodiment, the plurality of protrusion parts 102 was provided in a part (specifically, the base end part 19d of the cylindrical part 19) of the liner main body 15. Further, the protrusion part 102 protruded in a direction moving away from the cylindrical part 19. Thus, it is possible to fit (lock) the rotating shaft 111 (specifically, the plurality of fitting bar members 116 of the fitting part 114) of the manufacturing device 110 for the high-pressure tank to the protrusion part 102 of the liner 101. That is, it is possible to directly transmit the rotational force generated by the manufacturing device 110 for the high-pressure tank to the liner 101 without using the metal fitting 13.

Accordingly, it is possible to perform the high-speed FW molding without causing the idle rotation of the metal fitting 13 or the deformation of the liner 101, for example, when performing the high-speed FW molding using the manufacturing device 110 for the high-pressure tank.

Further, it is not necessary to form the idle rotation preventing unevenness in the metal fitting 13 and it is possible to simplify the shape of the metal fitting 13. Accordingly, it is possible to increase the workability of the metal fitting 13.

Moreover, the plurality of protrusion parts 102 protruded from the base end part 19d of the cylindrical part 19 toward the outside of the cylindrical part 19 (that is, the inside of the liner 101 in the axial direction) in the axial direction of the liner 101. Accordingly, since the rotating shaft 111 is inserted in the axial direction of the liner 101, it is possible to easily and reliably fit (lock) the fitting part 114 of the rotating shaft 111 to the plurality of protrusion parts 102.

In addition, the protrusion part 102 protruded from the base end part 19d of the cylindrical part 19 toward the inside of the liner 101 in the axial direction. Thus, it is possible to dispose the protrusion part 102 in the inner space 105 of the dome part 17 and to relatively large separate the protrusion part 102 to the outside in the radial direction from the axis of the liner 101.

Accordingly, it is possible to efficiently transmit the rotational force generated by the manufacturing device 110 for the high-pressure tank to the protrusion part 102.

Further, it is possible to easily mold, for example, the resinous liner 101 by projecting the plurality of protrusion parts 102 inward in the axial direction from the base end part 19d of the cylindrical part 19.

Moreover, since the plurality of protrusion parts 102 is continuously provided at intervals in the circumferential direction of the cylindrical part 19, it is possible to further reliably fit (lock) the fitting part 114 (specifically, the plurality of fitting bar members 116) to the plurality of protrusion parts 102. Accordingly, it is possible to further efficiently transmit the rotational force generated by the rotating shaft 111 to the liner 101 through the plurality of protrusion parts 102.

Further, the protrusion part 102 was formed in the cylindrical part 19 by projecting the cylindrical part 19 from the recessed part 18 of the liner 101 toward the outside of the liner 101. Accordingly, it is possible to easily fit (lock) the fitting part 114 (specifically, the plurality of fitting bar members 116) of the rotating shaft 111 to the protrusion part 102.

Moreover, the flange part 56 of the rotating shaft 111 is brought into contact with the metal fitting 13 (specifically, the end surface 27a of the flange 27) to be positioned at the fitting position in which the fitting part 114 (specifically, the plurality of fitting bar members 116) is fitted (locked) to the plurality of protrusion parts 102. Accordingly, it is possible to reliably and easily fit (lock) the fitting part 114 (specifically, the plurality of fitting bar members 116) provided in the rotating shaft 111 to the protrusion part 102 and to increase the productivity of the high-pressure tank 100.

Further, the fitting part 114 was provided with the unfolding part 115 and the plurality of fitting bar members 116 and the plurality of fitting bar members 116 was unfolded in the radial direction of the liner 101 by the unfolding part 115. Thus, it is possible to unfold the plurality of fitting bar members 116 in the radial direction of the liner 101 by the unfolding part 115 after inserting the fitting part 114 into the liner main body 15 (specifically, the inner space 105 of the dome part 17).

Accordingly, it is possible to fit (lock) the plurality of fitting bar members 116 arranged in the inner space 105 of the dome part 17 to the plurality of protrusion parts 102 and rotate the liner 101 by the rotating shaft 111.

Fourth Embodiment

<High-Pressure Tank>

Figure 10:
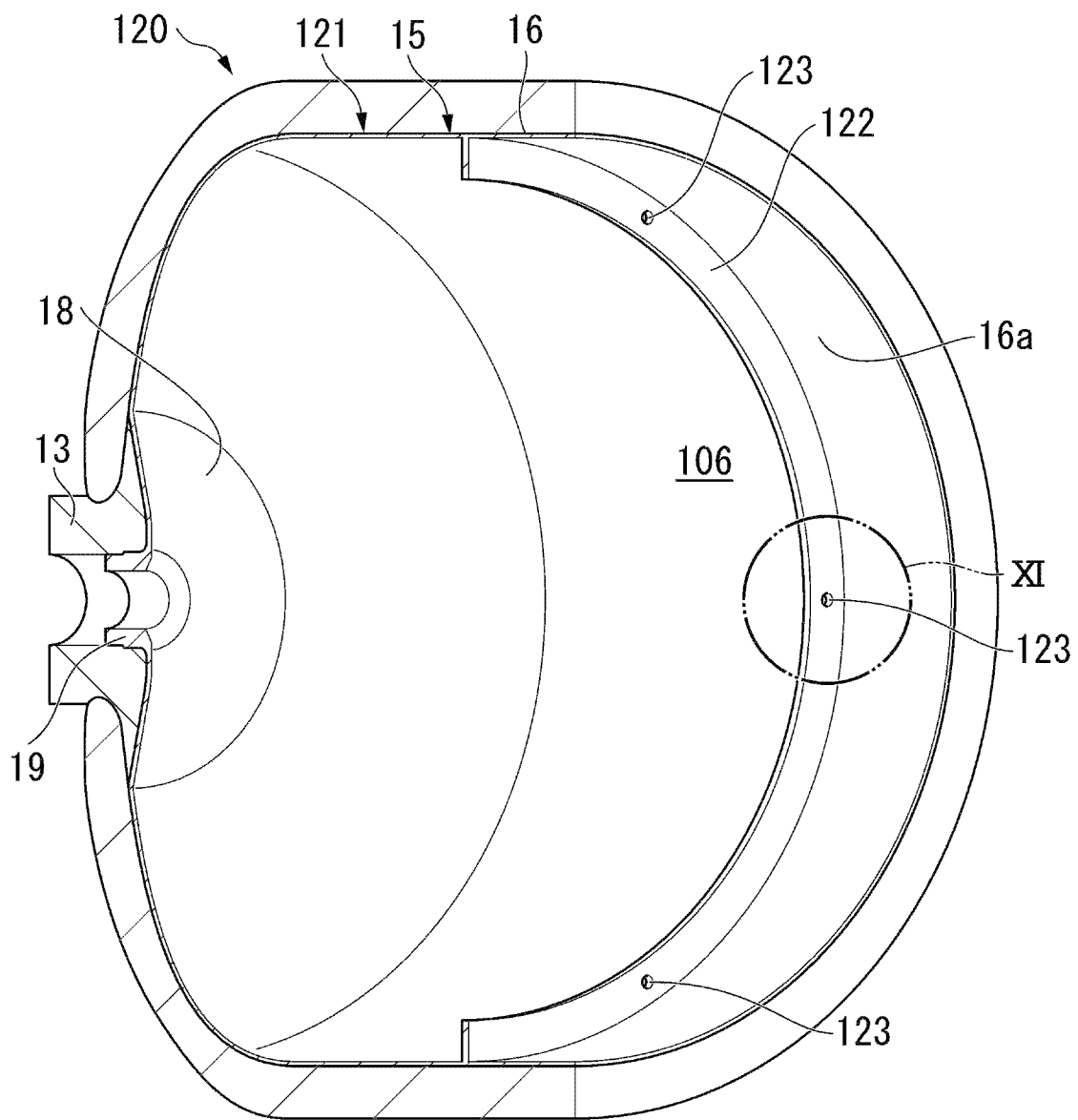
FIG. 10 is a perspective view showing a state in which a high-pressure tank of a fourth embodiment according to the disclosure is broken.

As shown in FIG. 10, a high-pressure tank 120 is the same as the high-pressure tank 10 of the first embodiment except that a liner 121 is provided instead of the liner 11 of the first embodiment and a protrusion part 122 is provided in the liner 121 instead of the protrusion part 20 of the first embodiment.

The protrusion part 122 is provided on, for example, an inner peripheral wall 16a of the body part 16 (that is, a part of the liner main body 15) by a bonding method such as welding. The protrusion part 122 protrudes (projected) inward in the radial direction in a direction moving away from the inner peripheral wall 16a of the body part 16 (the inner wall surface of the liner 121) and is formed in an annular shape to be continuous in the circumferential direction.

Figure 11:
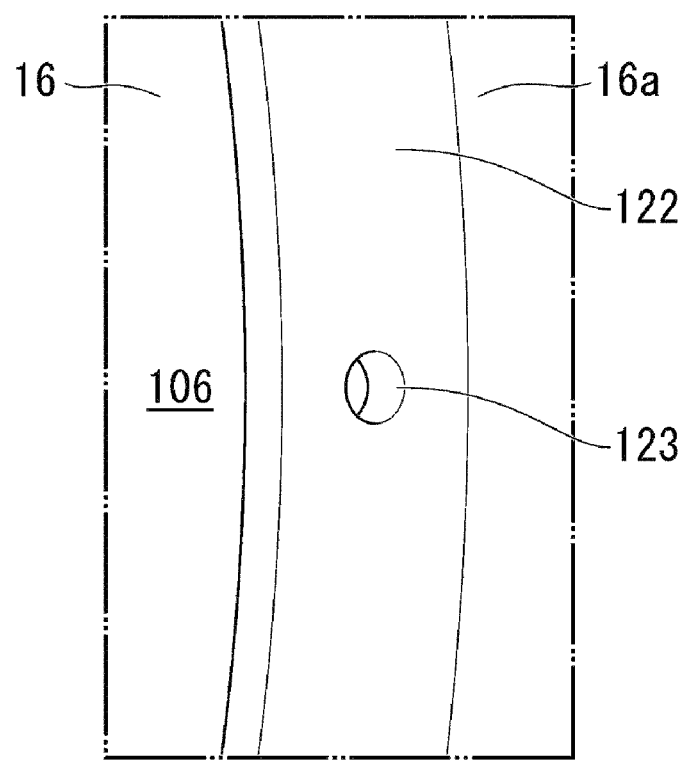
FIG. 11 is an enlarged perspective view of an XI part of FIG. 10.

As shown in FIGS. 10 and 11, a plurality of hole parts 123 is provided in the protrusion part 122 to penetrate in the axial direction of the liner 121. The plurality of hole parts 123 is continuously formed in the annular protrusion part 122 at intervals in the circumferential direction of the liner 121. The protrusion part 122 and the plurality of hole parts 123 are arranged in an inner space 106 of the body part 16.

Additionally, in the fourth embodiment, an example in which the plurality of hole parts 123 is formed in the protrusion part 122 has been described, but the disclosure is not limited thereto. As another example, for example, a plurality of groove parts may be formed in the protrusion part 122.

<High-Pressure Tank Manufacturing Device>

Figure 12:
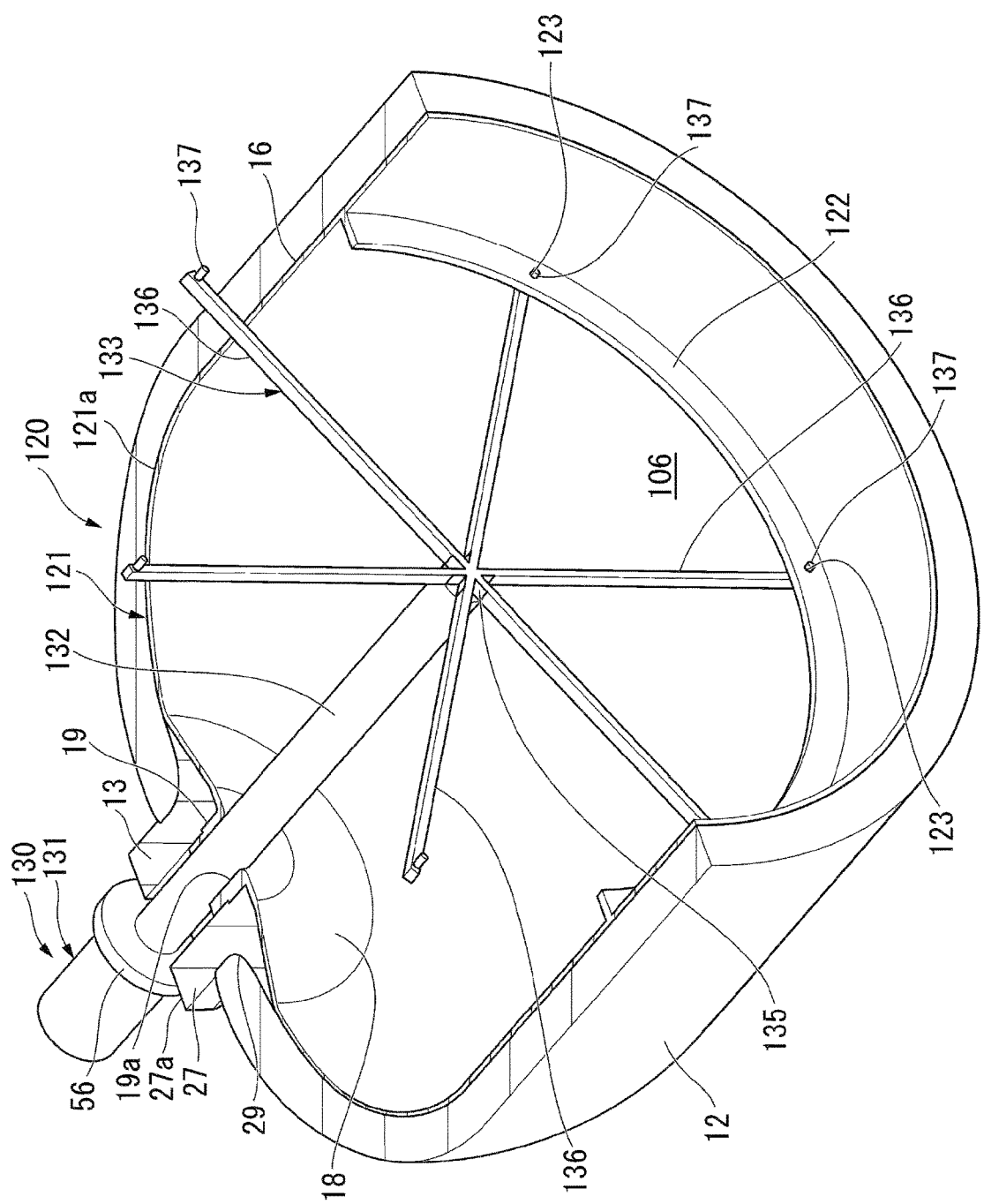
FIG. 12 is a perspective view showing a state in which a fitting part of a rotating shaft is fitted to the high-pressure tank of the fourth embodiment.
Figure 13:
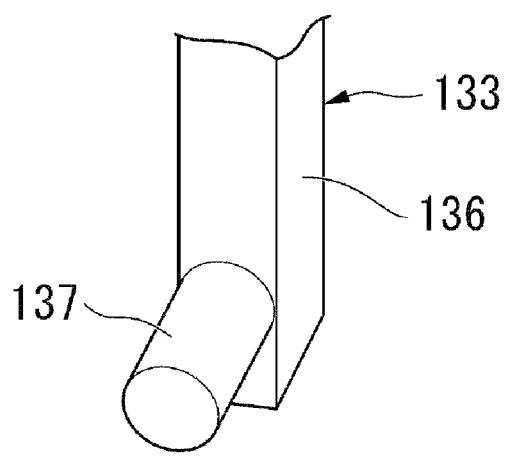
FIG. 13 is a perspective view showing a fitting pin of the fitting part of the fourth embodiment.

As shown in FIGS. 12 and 13, a manufacturing device 130 for a high-pressure tank is the same as the manufacturing device 50 for the high-pressure tank of the first embodiment except that a rotating shaft (rotating member) 131 is provided instead of the rotating shaft 55 of the first embodiment.

The rotating shaft 131 includes a support part 132 and a fitting part 133 instead of the support part 57, the inclined part 58, and the fitting part 59 of the first embodiment.

The support part 132 is provided at the front end side of the rotating shaft 131 with respect to the flange part 56. In a state in which the support part 132 is inserted into the metal fitting 13 and the cylindrical part 19, the outer peripheral surface contacts the inner peripheral surface 19a of the cylindrical part 19. Accordingly, the liner 121 is supported by the support part 132.

The fitting part 133 is provided at the front end part of the support part 132 (that is, the front end part of the rotating shaft 131).

The fitting part 133 includes an unfolding part (unfolding unit) 135, a plurality of fitting bar members (fitting members) 136, and a plurality of fitting pins 137.

The unfolding part 135 is provided at the front end part of the support part 132. The unfolding part 135 is provided with the plurality of fitting bar members 136. Specifically, the base end parts of the plurality of fitting bar members 136 are attached to the unfolding part 135. The fitting pin 137 is attached to the front end part of the fitting bar member 136. The fitting pin 137 protrudes toward the side opposite to the support part 132 in the axial direction of the liner 121 while the plurality of fitting bar members 136 is unfolded at the unfolding position (to be described later).

The unfolding part 135 has a function of selectively arranging the plurality of fitting bar members 136 between the unfolding position and the folding position.

That is, the plurality of fitting bar members 136 is arranged radially outward in the radial direction with respect to the axis of the support part 132 by being unfolded at the unfolding position, for example, by the operation of the unfolding part 135. In a state in which the plurality of fitting bar members 136 is arranged radially, the plurality of fitting pins 137 is fitted to the plurality of hole parts 123.

Further, the plurality of fitting bar members 136 and the plurality of fitting pins 137 are folded at the folding position, for example, by the operation of the unfolding part 135 to be arranged inside the cylindrical shape formed on the extension line of the outer peripheral surface of the support part 132. Thus, the plurality of fitting bar members 136 and the plurality of fitting pins 137 are insertable into the cylindrical part 19 together with the support part 132 while being arranged at the folding position.

Accordingly, it is possible to insert the fitting part 133 into the inner space 106 of the body part 16 by inserting the front end part of the support part 132 into the inner space of the liner main body 15 (specifically, the inner space 106 of the body part 16) while folding the plurality of fitting bar members 136 at the folding position. In this state, the plurality of fitting bar members 136 is unfolded at the unfolding position so that the plurality of fitting pins 137 is fitted to the plurality of hole parts 123. The plurality of hole parts 123 is formed in the protrusion part 122.

That is, the fitting part 133 is fitted (locked) to the protrusion part 122 in the rotation direction of the rotating shaft 131. Thus, the rotation of the rotating shaft 131 is transmitted to the protrusion part 122 through the fitting part 133. Accordingly, it is possible to rotate the metal fitting 13 and the liner 121 by the rotation of the rotating shaft 131.

<High-Pressure Tank Manufacturing Method>

Next, a method of manufacturing the high-pressure tank 120 by the manufacturing device 130 for the high-pressure tank will be described with reference to FIG. 12.

As shown in FIG. 12, in the inserting step, first, the unfolding part 135 of the fitting part 133 is operated to fold the plurality of fitting bar members 136 at the folding position. In this state, the rotating shaft 131 is moved in the axial direction of the liner 121 and the support part 132 of the rotating shaft 131 is inserted into the inner space 106 of the body part 16 through the inside of the metal fitting 13 and the inside of the cylindrical part 19.

By inserting the rotating shaft 131 thereinto, the outer peripheral surface of the support part 132 contacts the inner peripheral surface 19a of the cylindrical part 19 and the liner 121 and the metal fitting 13 are supported by the rotating shaft 131. Further, the fitting part 133 is inserted into the liner main body 15 (specifically, the inner space 106 of the body part 16) together with the support part 132.

Next, in the positioning step, the flange parts 56 of the rotating shaft 131 are positioned with a predetermined gap with respect to the metal fitting 13 (specifically, the end surface 27a of the flange 27). Accordingly, the fitting part 133 is positioned while being disposed in the inner space 106 of the body part 16.

Next, in the unfolding step, the unfolding part 135 of the fitting part 133 is operated after inserting the fitting part 133 so that the plurality of fitting bar members 136 is unfolded at the unfolding position to be radially arranged in the radial direction of the liner 121. In this state, the flange part 56 of the rotating shaft 131 comes into contact with the metal fitting 13 (specifically, the end surface 27a of the flange 27). Accordingly, the fitting pins 137 of the plurality of fitting bar members arranged radially are fitted to the plurality of hole parts 123. Accordingly, the plurality of fitting bar members 136 (that is, the fitting part 133) is fitted (locked) to the protrusion part 122 in the rotation direction of the rotating shaft 131.

Next, in the winding step, the rotating shaft 131 is rotated to rotate the metal fitting 13 and the liner 121. In this state, the fiber bundle 14 (see FIG. 3) is wound around an outer peripheral surface (outer periphery) 121a of the liner 121 or the recessed part 29 of the metal fitting 13 by the winding unit 53 shown in FIG. 3 to form the reinforcing fiber layer 12.

As described above, according to the high-pressure tank 120, the manufacturing device 130 for the high-pressure tank, and the manufacturing method for the high-pressure tank of the fourth embodiment, the protrusion part 122 was provided in a part (specifically, the inner peripheral wall 16a of the body part 16) of the liner main body 15. Further, the protrusion part 122 protrudes in a direction moving away from the inner peripheral wall 16a of the body part 16.

The plurality of hole parts 123 is formed in the protrusion part 122. Thus, it is possible to fit (lock) the rotating shaft 131 (specifically, the plurality of fitting pins 137 of the fitting part 133) of the manufacturing device 130 for the high-pressure tank to the protrusion part 122 (specifically, the plurality of hole parts 123) of the liner 121. That is, it is possible to directly transmit the rotational force generated by the manufacturing device 130 for the high-pressure tank to the liner 121 without using the metal fitting 13.

Accordingly, it is possible to perform the high-speed FW molding without causing the idle rotation of the metal fitting 13 or the deformation of the liner 121, for example, when performing the high-speed FW molding using the manufacturing device 130 for the high-pressure tank.

Further, it is not necessary to form the idle rotation preventing unevenness in the metal fitting 13 and it is possible to simplify the shape of the metal fitting 13. Accordingly, it is possible to increase the workability of the metal fitting 13.

Moreover, the protrusion part 122 protruded inward in the radial direction from the inner peripheral wall 16a of the body part 16 in the radial direction of the liner 121. Accordingly, since the rotating shaft 131 is inserted in the axial direction of the liner 121, it is possible to easily and reliably fit (lock) the fitting part 133 (specifically, the plurality of fitting pins 137) of the rotating shaft 131 to the protrusion part 122 (specifically, the plurality of hole parts 123).

Additionally, the plurality of hole parts 123 was continuously formed in the protrusion part 122 at intervals in the circumferential direction by causing the protrusion part 122 to protrude inward in the radial direction of the liner 121 from the inner peripheral wall 16a of the body part 16. The plurality of hole parts 123 is provided to penetrate in the axial direction of the liner 121.

Accordingly, since the fitting part 133 (specifically, the plurality of fitting pins 137) of the rotating shaft 131 is fitted (locked) to the plurality of hole parts 123, it is possible to efficiently transmit the rotational force generated by the manufacturing device 130 for the high-pressure tank to the protrusion part 122 through the rotating shaft 131.

Moreover, it is possible to reinforce the body part 16 by the protrusion part 122 by projecting the protrusion part 122 inward in the radial direction (that is, the inner space 106 of the body part 16) from the body part 16. Accordingly, it is possible to increase the strength of the liner 121.

Further, the flange part 56 of the rotating shaft 131 can be positioned to the metal fitting 13 (specifically, the end surface 27a of the flange 27) and the plurality of fitting bar members 136 can be positioned at the unfolding position. Furthermore, the flange part 56 comes into contact with the end surface 27a of the flange 27 so that the flange part 56 is positioned to the metal fitting 13. Thus, the fitting pin 137 of the fitting part 133 can be positioned to the fitting position fitted (locked) to the plurality of hole parts 123 of the protrusion part 122.

Accordingly, it is possible to reliably and easily fit (lock) the fitting part 133 (specifically, the plurality of fitting pins 137) provided in the rotating shaft 131 to the plurality of hole parts 123 of the protrusion part 122 and to increase the productivity of the high-pressure tank 120.

Further, the fitting part 133 was provided with the unfolding part 135, the plurality of fitting bar members 136, and the plurality of fitting pins 137 and the plurality of fitting bar members 136 were unfolded in the radial direction of the liner 121 by the unfolding part 135. Thus, it is possible to unfold the plurality of fitting bar members 136 in the radial direction of the liner 121 by the unfolding part 135 after inserting the fitting part 133 into the liner main body 15 (specifically, the inner space 106 of the body part 16). The fitting bar member 136 is provided with the fitting pin 137.

Accordingly, it is possible to fit (lock) the plurality of fitting pins 137 arranged in the inner space 106 of the body part 16 to the protrusion part 122 (specifically, the plurality of hole parts 123) and to rotate the liner 121 by the rotating shaft 131.

Fifth Embodiment

<High-Pressure Tank>

Figure 14:
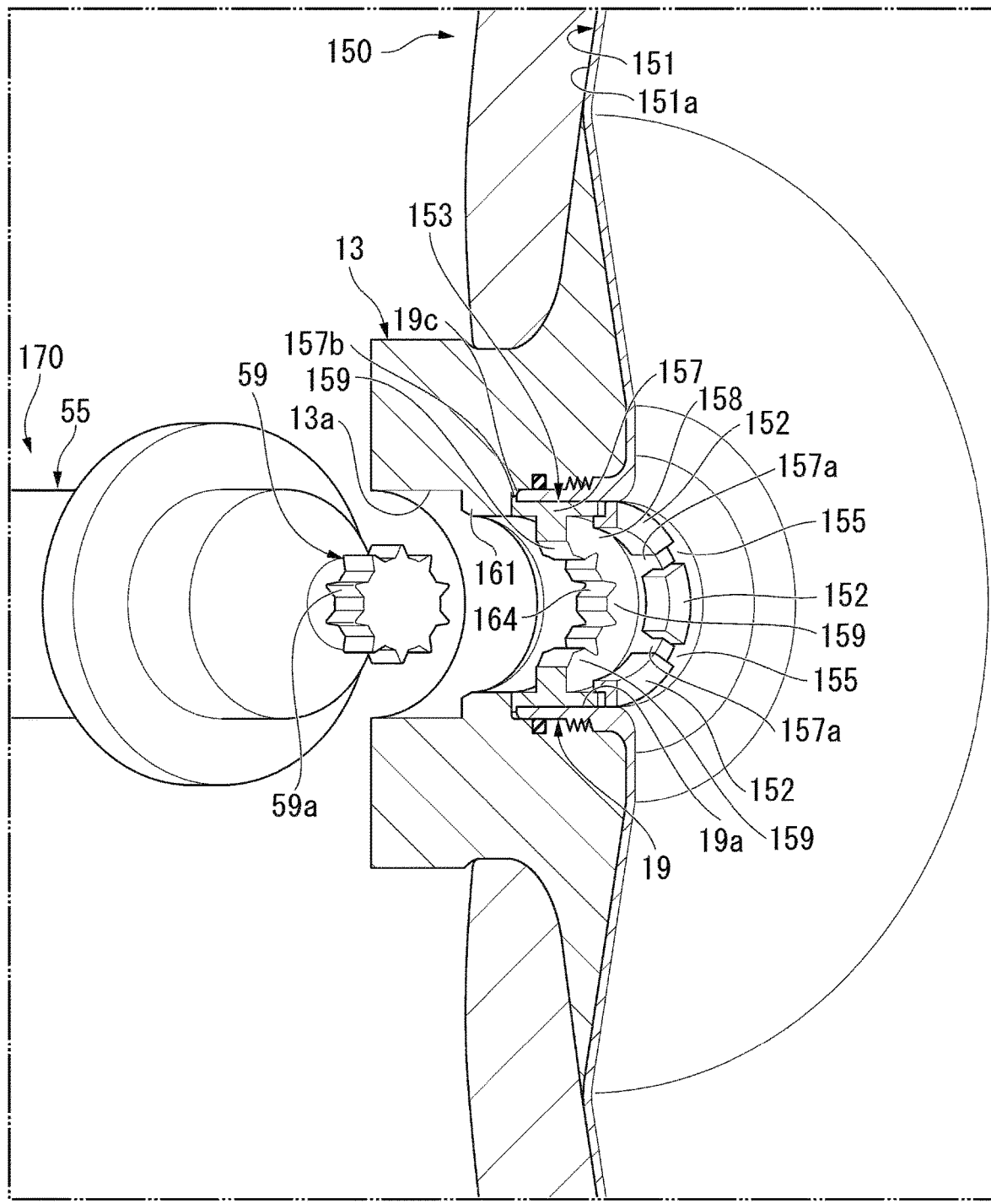
FIG. 14 is a perspective view showing the high-pressure tank and the rotating shaft of a manufacturing device of the fourth embodiment according to the disclosure while the high-pressure tank is broken.
Figure 15:
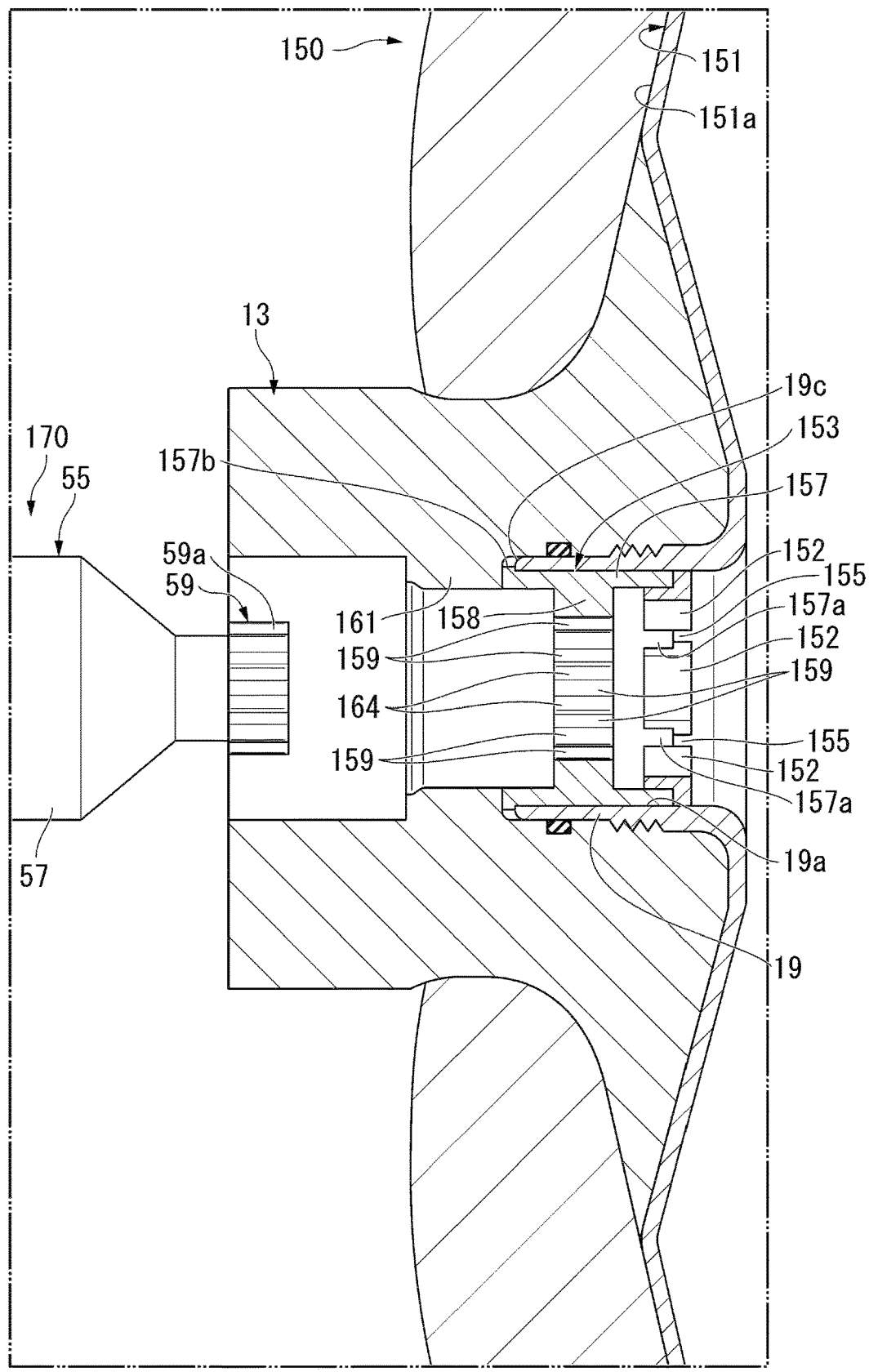
FIG. 15 is a cross-sectional view showing the high-pressure tank of the fourth embodiment.

As shown in FIGS. 14 and 15, a high-pressure tank 150 is the same as the high-pressure tank 10 of the first embodiment except that a liner 151 is provided instead of the liner 11 of the first embodiment and a protrusion part 152 and a fitting member 153 are provided in the liner 151.

The plurality of protrusion parts 152 is provided on the inner peripheral surface 19a of the cylindrical part 19. The plurality of protrusion parts 152 is continuously formed at intervals in the circumferential direction of the inner peripheral surface 19a of the cylindrical part 19. Further, a fitting concave part 155 is formed between the adjacent protrusion parts 152 to penetrate in the axial direction.

Here, the cylindrical part 19 is a part that forms a part of the liner main body 15. Thus, the plurality of protrusion parts 152 is integrally molded with a part of the liner main body 15. The fitting member 153 is fitted to the plurality of protrusion parts 152.

The fitting member 153 is inserted into the cylindrical part 19 and is fitted to the plurality of protrusion parts 152. The fitting member 153 is integrally molded by an aluminum alloy or other metal, for example, similarly to the liner 151.

The fitting member 153 includes an annular wall 157, an annular flange 158, and a convex part 159. The annular wall 157 is formed in an annular shape to contact the inner peripheral surface 19a of the cylindrical part 19. In the annular wall 157, a plurality of protrusion parts 157a is formed at an end part on the side of the plurality of protrusion parts 152 and an annular projection piece 157b is formed at an end part on the side opposite to the plurality of protrusion parts 152.

The plurality of protrusion parts 157a is inserted into the plurality of fitting concave parts 155 in the axial direction and is fitted to the plurality of protrusion parts 152. Accordingly, the fitting member 153 restricts the circumferential rotation with respect to the cylindrical part 19.

Further, the projection piece 157b comes into contact with the front end surface 19c of the cylindrical part 19 and a metal fitting flange 161 while the plurality of protrusion parts 157a is fitted to the plurality of fitting concave parts 155. The metal fitting flange 161 protrudes inward in the radial direction from the inner peripheral surface of the metal fitting 13. Accordingly, the axial movement of the fitting member 153 is restricted. That is, the fitting member 153 is firmly fixed into the cylindrical part 19 in the restricted state of the movement in the circumferential direction and the axial direction.

The annular flange 158 is formed on the inner peripheral surface of the annular wall 157. The annular flange 158 is formed in an annular shape along the inner peripheral surface of the annular wall 157. The annular flange 158 is provided with the plurality of convex parts 159.

The plurality of convex parts 159 is continuously formed along the annular flange 158 at intervals in the circumferential direction of the inner peripheral surface of the annular wall 157. The convex part 159 protrudes inward in the radial direction of the liner 151 in a direction moving away from the inner peripheral surface 19a of the cylindrical part 19. In other words, the convex part 159 protrudes in a direction moving away from the liner main body 15 (the inner wall surface of the liner 151). For example, the convex part 159 is formed in the same manner as the protrusion part 20 of the first embodiment.

Specifically, the convex part 159 protrudes, for example, in a V shape so that the projection width gradually decreases from the annular flange 158 toward the inside of the liner 151 in the radial direction when viewed from the axial direction of the liner 151. Further, a V-shaped concave part 164 is formed between the adjacent convex parts 159.

Additionally, the convex part 159 is not limited to the V shape (triangular shape) and may be formed in another shape such as a rectangular shape.

<High-Pressure Tank Manufacturing Device>

A manufacturing device 170 for a high-pressure tank is configured in the same manner as the manufacturing device 50 for the high-pressure tank of the first embodiment. Thus, each component of the manufacturing device 170 for the high-pressure tank is denoted by the same reference numeral as that of the manufacturing device 50 for the high-pressure tank of the first embodiment and a detailed description will be omitted.

<High-Pressure Tank Manufacturing Method>

Next, a method of manufacturing the high-pressure tank 150 by the manufacturing device 170 for the high-pressure tank will be described with reference to FIGS. 14 and 16. As shown in FIG. 14, in the inserting step, the rotating shaft 55 is moved in the axial direction of the liner 151 and the rotating shaft 55 is inserted into the metal fitting 13 and the cylindrical part 19 (specifically, the inside of the fitting member 153). By inserting the rotating shaft 55 thereinto, the outer peripheral surface of the support part 57 contacts the inner peripheral surface 13a of the metal fitting 13 and the metal fitting 13 and the liner 151 are supported by the rotating shaft 55. Further, the fitting part 59 is fitted to the plurality of concave parts 164 of the fitting member 153.

Figure 16:
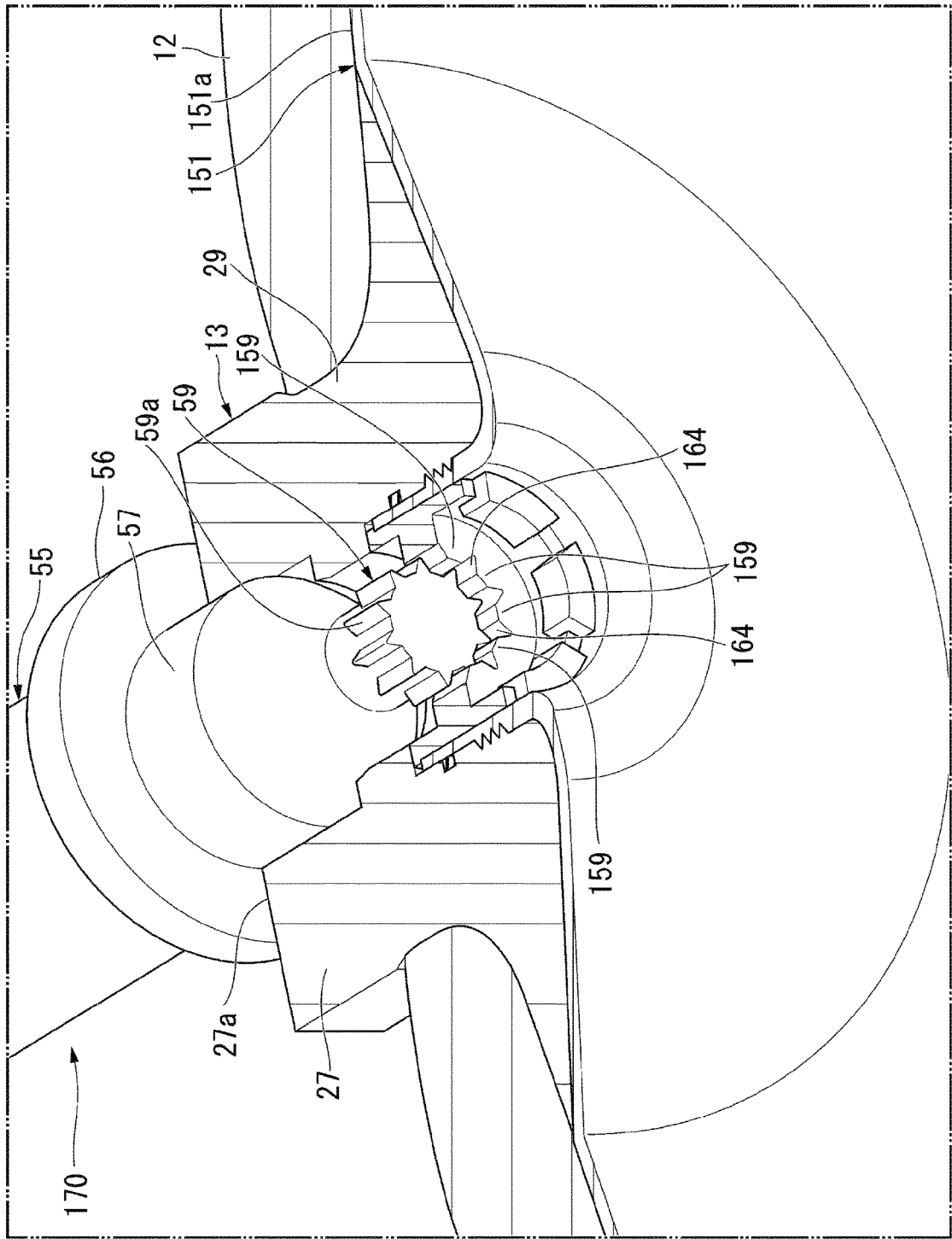
FIG. 16 is a perspective view showing a state in which the fitting part of the rotating shaft is fitted to the high-pressure tank of the fourth embodiment.

As shown in FIG. 16, the fitting part 59 fitted to the plurality of concave parts 164 is meshed with the plurality of convex parts 159. Accordingly, the fitting part 59 is fitted (locked) to the plurality of convex parts 159 in the rotation direction of the rotating shaft 55.

Next, in the positioning step, the flange part 56 of the rotating shaft 55 comes into contact with the metal fitting 13 (specifically, the end surface 27a of the flange 27). Accordingly, the fitting part 59 is positioned at the fitting position fitted (locked) to the plurality of convex parts 159.

Next, in the winding step, the rotating shaft 55 is rotated to rotate the metal fitting 13 and the liner 151. In this state, the fiber bundle 14 (see FIG. 3) is wound around an outer peripheral surface (outer periphery) 151a of the liner 151 or the recessed part 29 of the metal fitting 13 by the winding unit 53 shown in FIG. 3 to form the reinforcing fiber layer 12.

As described above, according to the high-pressure tank 150, the manufacturing device 170 for the high-pressure tank, and the manufacturing method for the high-pressure tank of the fifth embodiment, the plurality of protrusion parts 152 was provided in a part (specifically, the cylindrical part 19) of the liner main body 15. Further, the fitting member 153 was fitted to the plurality of protrusion parts 152 and the fitting member 153 was firmly fixed into the cylindrical part 19. In addition, the plurality of convex parts 159 was integrally molded with the fitting member 153 and the plurality of convex parts 159 protruded in a direction moving away from the inner peripheral surface of the cylindrical part 19.

Thus, it is possible to fit (lock) the rotating shaft 55 (specifically, the fitting part 59) of the manufacturing device 50 for the high-pressure tank to the plurality of convex parts 159 provided in the liner 151. That is, the convex part 159 is a part that plays the same role as that of the protrusion part 20 of the first embodiment.

Since the fitting part 59 of the rotating shaft 55 is fitted (locked) to the plurality of convex parts 159, it is possible to directly transmit the rotational force generated by the manufacturing device 50 for the high-pressure tank to the liner 151 without using the metal fitting 13.

Accordingly, it is possible to perform the high-speed FW molding without causing the idle rotation of the metal fitting 13 or the deformation of the liner 151, for example, when performing the high-speed FW molding using the manufacturing device 50 for the high-pressure tank.

Further, it is not necessary to form the idle rotation preventing unevenness in the metal fitting 13 and it is possible to simplify the shape of the metal fitting 13. Accordingly, it is possible to increase the workability of the metal fitting 13.

Further, the plurality of convex parts 159 protruded inward in the radial direction of the cylindrical part 19. Accordingly, since the rotating shaft 55 of the manufacturing device 50 for the high-pressure tank is inserted in the axial direction of the liner 151, it is possible to easily and reliably fit (lock) the fitting part 59 of the rotating shaft 55 to the plurality of convex parts 159.

Moreover, since the convex part 159 fitted (locked) to the fitting part 59 is formed on the inner peripheral surface of the fitting member 153, it is possible to simplify the protrusion part 152 and to simplify the shape of the cylindrical part 19. Accordingly, since the plurality of protrusion parts 152 protrudes inward in the radial direction of the cylindrical part 19, for example, it is possible to easily mold the resinous liner 151 and to increase the productivity of the liner 151.

Moreover, since the plurality of convex parts 159 is continuously provided at intervals in the circumferential direction of the cylindrical part 19, it is possible to further reliably fit (lock) the fitting part 59 to the plurality of convex parts 159. Accordingly, it is possible to further efficiently transmit the rotational force generated by the rotating shaft 55 to the liner 151 through the plurality of convex parts 159.

Further, the convex part 159 was formed in the cylindrical part 19 by projecting the cylindrical part 19 from the recessed part 18 of the liner 151 toward the outside of the liner 151. Accordingly, it is possible to easily fit (lock) the fitting part 59 of the rotating shaft 55 to the convex part 159.

Moreover, the flange part 56 of the rotating shaft 55 was brought into contact with the metal fitting 13 (specifically, the end surface 27a of the flange 27) to be positioned at the fitting position in which the fitting part 59 is fitted (locked) to the plurality of convex parts 159. Accordingly, it is possible to reliably and easily fit (lock) the rotating shaft 55 to the convex part 159 and to increase the productivity of the high-pressure tank 150.

Additionally, the technical scope of the disclosure is not limited to the above-described embodiments and various modifications can be made in the scope not departing from the spirit of the disclosure.

For example, in the above-described embodiments, an example in which the protrusion parts 20, 72, 102, 122, and 152 are provided on both sides of the liners 11, 71, 101, 121, and 151 has been described, but the disclosure is not limited thereto. As another example, for example, the protrusion parts 20, 72, 102, 122, and 152 may be provided on either side of the liners 11, 71, 101, 121, and 151.

In addition, the components in the embodiments can be replaced with well-known components as appropriate without departing from the spirit of the disclosure and the above-described modified examples may be appropriately combined.

What is claimed is:

1. A high-pressure tank comprising:
   a liner;
   a reinforcing fiber layer which is formed on an outer periphery of the liner by rotating the liner with a rotating member and winding a fiber bundle around the liner; and
   a metal fitting which is attached to the liner,
   wherein a part of a main body of the liner is provided with a protrusion part which protrudes in a direction moving away from the main body and is fittable to the rotating member, and the rotating member directly transmits a rotational force to the liner without using the metal fitting.

2. The high-pressure tank according to claim 1,
   wherein the protrusion part protrudes in an axial direction of the liner or protrudes inward in a radial direction of the liner.

3. The high-pressure tank according to claim 1,
   wherein a plurality of the protrusion parts is continuously provided in a circumferential direction of the liner.

4. The high-pressure tank according to claim 1,
   wherein the liner includes a cylindrical body part, dome parts which are provided on both sides of the cylindrical body part in an axial direction, a recessed part which is provided on the outside of at least one of the dome parts, and a cylindrical part which protrudes from the recessed part and has a diameter smaller than that of the cylindrical body part, and
   wherein the protrusion part is provided in the cylindrical part.

5. The high-pressure tank according to claim 1,
   wherein the liner includes a cylindrical body part, dome parts which are provided on both sides of the cylindrical body part in an axial direction, a recessed part which is provided on the outside of at least one of the dome parts, and a cylindrical part which protrudes from the recessed part and has a diameter smaller than that of the cylindrical body part, and
   wherein the protrusion part is provided to protrude outward in the axial direction of the liner from a front end of the cylindrical part.

6. The high-pressure tank according to claim 1,
   wherein the liner includes a cylindrical body part, dome parts which are provided on both sides of the cylindrical body part in an axial direction, a recessed part which is provided on the outside of at least one of the dome parts, and a cylindrical part which protrudes from the recessed part and has a diameter smaller than that of the cylindrical body part, and
   wherein the protrusion part is provided to protrude inward in the axial direction of the liner from a base end part of the cylindrical part.

7. The high-pressure tank according to claim 1,
   wherein the liner includes a cylindrical body part, and
   wherein the cylindrical body part includes the protrusion part protruding inward in a radial direction of the liner and the protrusion part is provided with a hole part or a groove part penetrating in an axial direction of the liner.

8. The high-pressure tank according to claim 4,
   wherein a fitting member is provided to be inserted into the cylindrical part and to be fitted to the protrusion part, and
   wherein an inner peripheral surface of the fitting member is provided with a convex part protruding in a radial direction.

9. A manufacturing method for a high-pressure tank including a liner, a reinforcing fiber layer formed on an outer periphery of the liner, and a metal fitting attached to the liner and having a protrusion part provided in a part of a main body of the liner to protrude in a direction moving away from the main body, the manufacturing method comprising:
   an inserting step of inserting a rotating member rotating the liner into the liner; and a winding step of winding a fiber bundle around the liner to obtain the reinforcing fiber layer, wherein in the inserting step, the rotating member is moved in an axial direction of the liner to be fitted to the protrusion part, and wherein the winding step is performed in a state being fitted, wherein the rotating member directly transmits a rotational force to the liner without using the metal fitting.

10. The manufacturing method according to claim 9, further comprising:

a positioning step of positioning the rotating member, wherein in the positioning step, a flange part provided in the rotating member is positioned with respect to the metal fitting.

11. The manufacturing method according to claim 9, wherein the rotating member further includes a fitting member fitted to the protrusion part, and wherein the manufacturing method further comprises an unfolding step of unfolding the fitting member in a radial direction of the liner after inserting the fitting member into the liner.

* * * * *